United States Patent
Murray, III

(10) Patent No.: US 12,206,315 B1
(45) Date of Patent: Jan. 21, 2025

(54) GRAVITATIONAL TORQUE AMPLIFIER

(71) Applicant: James F. Murray, III, Oklahoma City, OK (US)

(72) Inventor: James F. Murray, III, Oklahoma City, OK (US)

( * ) Notice: Subject to any disclaimer, the term of this patent is extended or adjusted under 35 U.S.C. 154(b) by 0 days.

(21) Appl. No.: 18/345,871

(22) Filed: Jun. 30, 2023

Related U.S. Application Data

(60) Provisional application No. 63/367,418, filed on Jun. 30, 2022.

(51) Int. Cl.
*H02K 7/116* (2006.01)
*F03G 3/00* (2006.01)

(52) U.S. Cl.
CPC .............. *H02K 7/116* (2013.01); *F03G 3/00* (2013.01)

(58) Field of Classification Search
CPC .................................. H02K 7/116; F03G 3/00
See application file for complete search history.

(56) References Cited

U.S. PATENT DOCUMENTS

| | | | |
|---|---|---|---|
| 3,252,023 A | 5/1966 | Schmidt | |
| 3,477,536 A | 11/1969 | Carini | |
| 3,519,222 A | 7/1970 | Altekruse et al. | |
| 3,562,567 A | 2/1971 | Carini | |
| 4,031,420 A | 6/1977 | Carini | |
| 4,292,854 A * | 10/1981 | Liebing | G01C 25/005 74/5.34 |
| 4,753,023 A | 6/1988 | Little | |
| 5,495,907 A | 3/1996 | Data | |
| 8,066,226 B2 | 11/2011 | Fiala et al. | |
| 8,307,652 B1 | 11/2012 | Gallistel | |

(Continued)

FOREIGN PATENT DOCUMENTS

| | | |
|---|---|---|
| CA | 1278014 C | 12/1990 |
| CA | 2773362 A1 | 2/2011 |
| CN | 102207064 A | 10/2011 |
| CN | 103930671 B | 9/2017 |

(Continued)

OTHER PUBLICATIONS

Mitcheson, et al, Acontinuously rotating energy harvester with maximum power point tracking, Journal of Micromechanics and Microengineering, vol. 118, pp. 104008-7, Oct. 2008, accessed Jun. 28, 2023, <https://iopscience.iop.org/article/10.1088/0960-1317/18/10/104008/pdf>.

*Primary Examiner* — Jacob S. Scott
*Assistant Examiner* — Farhana Pervin
(74) *Attorney, Agent, or Firm* — Thompson Patent Law Offices PC

(57) ABSTRACT

Apparatus and associated methods relate to torque amplifiers. In an illustrative example, prime movers may be disposed radially to and orbiting about a central axis. Each prime mover, for example, may include a rotor coupled to the central axis by planetary gearing such that a torque generated by the rotor is transmitted to the central axis via the planetary gearing. Each prime mover may, for example, include a stator and a counter-torque anchor coupled to the stator and suspended by the central axis such that the counter-torque anchor generates a counter-torque on the stator such that the torque of the rotor and the corresponding counter-torque additively generate work relative to the central axis. Various embodiments may advantageously increase a power output of the torque amplifier relative to a power supplied by the prime movers.

23 Claims, 16 Drawing Sheets

(56) References Cited

U.S. PATENT DOCUMENTS

| | | |
|---|---|---|
| 2002/0194939 A1 | 12/2002 | Cox |
| 2004/0173037 A1* | 9/2004 | Guerrero ............... B64G 1/285 |
| | | 74/5.34 |
| 2005/0022620 A1 | 2/2005 | Smith |
| 2009/0235765 A1 | 9/2009 | Buchele et al. |
| 2009/0318256 A1 | 12/2009 | Leviny |
| 2010/0301712 A1 | 12/2010 | Amutham |
| 2011/0114399 A1* | 5/2011 | Palfai .................... H02K 7/116 |
| | | 180/65.6 |
| 2012/0139368 A1 | 6/2012 | Murray, III |
| 2014/0187375 A1 | 7/2014 | Leviny |
| 2015/0239332 A1 | 8/2015 | Okuda et al. |
| 2016/0195071 A1 | 7/2016 | Pellegrin |
| 2018/0041097 A1* | 2/2018 | Kanahama ............... H02K 7/04 |
| 2020/0049132 A1* | 2/2020 | Traner ..................... F03G 7/10 |
| 2020/0290448 A1 | 9/2020 | Carew |

FOREIGN PATENT DOCUMENTS

| | | |
|---|---|---|
| CN | 112997004 A | 6/2021 |
| DE | 102009043663 A1 | 6/2011 |
| DE | 102016014207 A1 | 7/2017 |
| DE | 102017004445 A1 | 11/2018 |
| EP | 2546520 A1 | 1/2013 |
| FR | 2822198 A1 | 9/2002 |
| GB | 2454525 A | 5/2009 |
| IN | 7173DELNP2015 | 1/2016 |
| IN | 362222 B | 3/2021 |
| KR | 20140101020 A | 8/2014 |
| KR | 20150051521 A | 5/2015 |
| WO | 1992012343 A1 | 7/1992 |
| WO | 1992022746 A1 | 12/1992 |
| WO | 2008053506 A2 | 5/2008 |
| WO | 2012023003 A1 | 2/2012 |
| WO | 2014111756 A1 | 7/2014 |
| WO | 2015003205 A1 | 1/2015 |

* cited by examiner

GRAVITATIONAL TORQUE AMPLIFIER

CROSS-REFERENCE TO RELATED APPLICATIONS

This application claims the benefit of U.S. Provisional Application Ser. No. 63/367,418, titled "Gravitational Torque Amplifier," filed by James F. Murray, III, on Jun. 30, 2022.

This application incorporates the entire contents of the foregoing application(s) herein by reference.

The subject matter of this application may have common inventorship with and/or may be related to the subject matter of the following:

- Canadian Application Serial No. CA534970, titled "ALTERNATOR HAVING AN OLIQUELY DISPOSED ROTOR," filed by James F. Murray, III on Aug. 12, 2010;
- PCT Application Serial No. PCTUS8700853, titled "ALTERNATOR HAVING IMPROVED EFFICIENCY," filed by James F. Murray, III on Apr. 15, 1987;
- PCT Application Serial No. PCTUS201265199, titled "CONTROLLER FOR BACK EMF REDUCING MOTOR," filed by James F. Murray, et al., on Nov. 15, 2012;
- PCT Application Serial No. PCTUS2012063615, titled "CONTROLLER FOR TOROIDAL MOTOR HAVING BACK EMF REDUCTION," filed by James F. Murray, et al., on Nov. 15, 2012;
- PCT Application Serial No. PCTUS2012063864, titled "MULTI-POLE ELECTRIC ELECTRODYNAMIC MACHINE WITH A CONSTANT AIR GAP TO REDUCE BACK TORQUE," filed by James F. Murray on Jun. 4, 2009;
- U.S. application Ser. No. 13/669,341, titled "Multi-Pole Electrodynamic Machine with a Constant Air Gap And An Elliptical Swash-Plate Rotor To Reduce Back Torque," filed by James F. Murray on Nov. 5, 2012;
- PCT Application Serial No. PCTUS2012065258, titled "MULTI-POLE SWITCHED RELUCTANCE D. C. MOTOR WITH FIXED AIR GAP AND RECOVERY OF INDUCTIVE FIELD ENERGY," filed by James F. Murray, et al., on Nov. 5, 2012;
- PCT Application Serial No. PCTUS2010045298, titled "PULSED MULTI-ROTOR CONSTANT AIR GAP MOTOR CLUSTER," filed by James F. Murray, III on Nov. 15, 2012;
- PCT Application Serial No. PCTUS201045298, titled "PULSED MULTI-ROTOR CONSTANT AIR GAP MOTOR CLUSTER," filed by James F. Murray, III on Nov. 5, 2012;
- Canadian Application Serial No. CA2773362, titled "PULSED MULTI-ROTOR CONSTANT AIR GAP MOTOR CLUSTER," filed by James F. Murray, III on Nov. 5, 2012;
- European Application Serial No. EP10808748, titled "PULSED MULTI-ROTOR CONSTANT AIR GAP MOTOR CLUSTER," filed by James F. Murray, III on Jun. 4, 2009;
- U.S. application Ser. No. 12/993,941, titled "Pulsed multi-rotor constant air gap switched reluctance motor," filed by James F. Murray on Nov. 7, 2012;
- U.S. application Ser. No. 12/993,941, titled "PULSED MULTI-ROTOR CONSTANT AIR GAP SWITCHED RELUCTANCE MOTOR," filed by James F. Murray on Jun. 4, 2009;
- PCT Application Serial No. PCTUS2009046246, titled "PULSED MULTI-ROTOR CONSTANT AIR GAP SWITCHED RELUCTANCE MOTOR," filed by James F. Murray on Dec. 13, 2016;
- U.S. application Ser. No. 15/377,860, titled "Switched energy resonant power supply system," filed by James F. Murray on Nov. 7, 2012;
- PCT Application Serial No. PCTUS2012065221, titled "THREE PHASE SYNCHRONOUS RELUCTANCE MOTOR WITH CONSTANT AIR GAP AND RECOVERY OF INDUCTIVE FIELD ENERGY," filed by James F. Murray on Aug. 12, 2010;
- PCT Application Serial No. PCTUS2012063616, titled "TOROIDAL MOTOR DESIGN HAVING BACK EMF REDUCTION," filed by James F. Murray on Aug. 12, 2010;
- PCT Application Serial No. PCTUS201263616, titled "TOROIDAL MOTOR DESIGN HAVING BACK EMF REDUCTION," filed by James F. Murray on Apr. 16, 1987;
- U.S. application Ser. No. 13/669,360, titled "TOROIDAL MOTOR DESIGN HAVING BACK EMF REDUCTION," filed by James F. Murray on Aug. 12, 2010;

This application incorporates the entire contents of the foregoing application(s) herein by reference.

TECHNICAL FIELD

Various embodiments relate generally to epicyclic gearing arrangements and orbital mechanics utilized in electromechanical means.

BACKGROUND

Newton's Third Law of Motion states that, for every action, there is an equal and opposite reaction. Generally, Newton's Third Law of Motion law may be associated with linear motions, such as the recoil of a cannon when fired, or a lift-off of a rocket under an influence of an explosive release of hot gasses from the rocket engine nozzle. This law of motion pertains also to various forms of angular motion as well. In angular motion, Newton's Third Law of Motion is involved with equal and opposite Torques.

With electric motors that produce a rotational form of output power, if a load were to be placed upon the shaft of an electric motor whose stator was not bolted down to a bench or a restraining framework, upon the application of electric power, two torques would be created, one acting upon the motor's armature, the other upon its stator structure.

In recent years, with the integration of computer chips into electric motors to control such variables as voltage, duty cycle, pulse width modulation and output torque and with the great advances in electrical steel alloys, permanent magnetic design, and various schemes devised to take advantage of reluctance paths embedded within motor lamination stacks, there is an increased interest in motor efficiency.

SUMMARY

Apparatus and associated methods relate to torque amplifiers. In an illustrative example, prime movers may be disposed radially to and orbiting about a central axis. Each prime mover, for example, may include a rotor coupled to the central axis by planetary gearing such that a torque generated by the rotor is transmitted to the central axis via the planetary gearing. Each prime mover may, for example, include a stator and a counter-torque anchor coupled to the stator and suspended by the central axis such that the counter-torque anchor generates a counter-torque on the stator such that the torque of the rotor and the corresponding counter-torque additively generate work relative to the central axis. Various embodiments may advantageously increase a power output of the torque amplifier relative to a power supplied by the prime movers.

Various embodiments may achieve one or more advantages. For example, some embodiments may relate to an epicyclic gearing system. In an illustrative example, the epicyclic gearing system may include a plurality of orbiting electric motors arranged within an epicyclic gearing configuration. The orbiting electric motors may provide a relative torque, for example, that may be extracted from the earth's gravitational field, and mechanically added to the electrically produced armature torques developed by the orbiting motors. Various embodiments may advantageously improve overall system efficiency without violating the laws of Energy Conservation.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an illustrative torque amplification system is introduced with reference to FIGS. 1-2, in the context of gravitational torque amplification. Second, that introduction leads into a description with reference to FIGS. 2-5 of some exemplary embodiments of electric motors that may be implemented, for example, in a torque amplification system. Third, with reference to FIGS. 6-13, principles and examples related to torque amplification (e.g., by additively applying a torque and counter-torque) are discussed. Fourth, and with reference to FIGS. 14-15, this document describes exemplary implementations of a gravitational torque amplifier. Fifth, this disclosure turns to a review of experimental data with respect to torque amplification and reduction of moment of inertia, with respect to FIG. 16. Finally, the document discusses further embodiments, exemplary applications and aspects relating to torque amplification.

Figure 1:
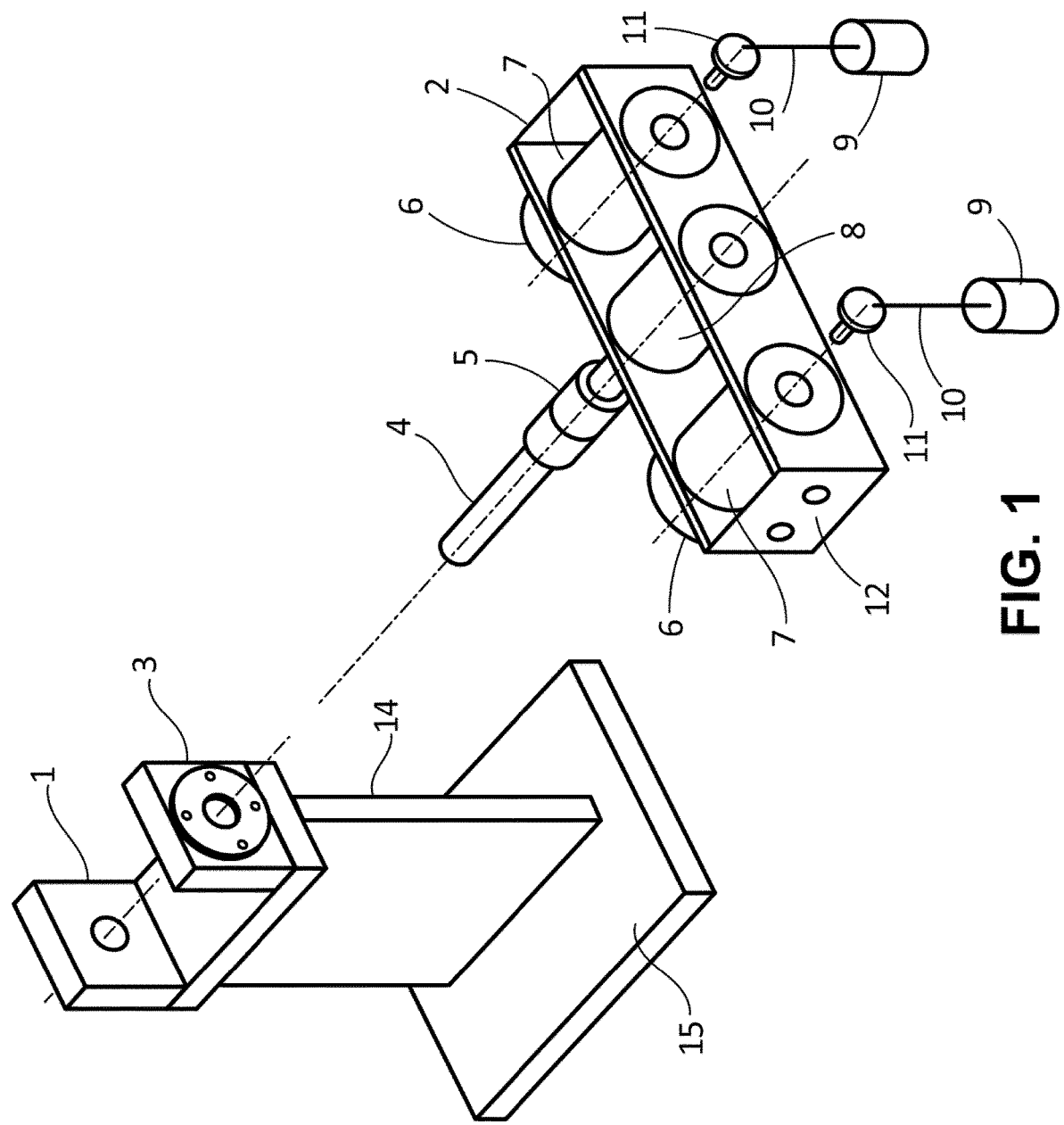
FIG. 1 depicts an explosion diagram an exemplary Gravitational Torque Amplifier (GTA).
Figure 2:
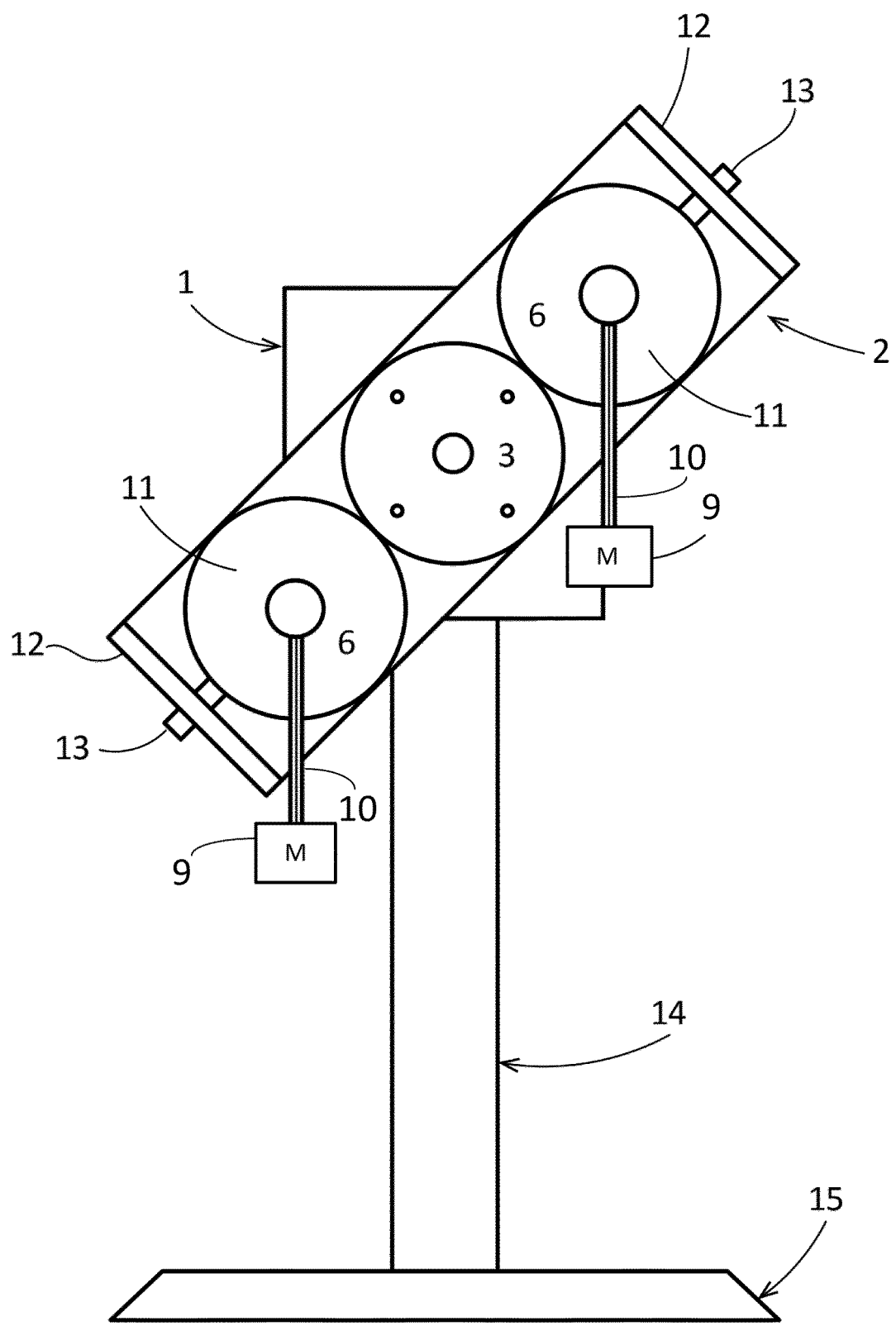
FIG. 2 illustrates a rear view of an exemplary GTA that includes an exemplary rotor assembly.

FIG. 1 depicts an explosion diagram an exemplary Gravitational Torque Amplifier (GTA). FIG. 2 illustrates a rear view of the exemplary GTA that includes an exemplary rotor assembly.

In this example, by way of illustration and without limitation, the individual parts of the GTA are herein identified, and numbered as follows.

Item #01=Main Frame Assembly.
Item #02=Rotor Assembly.
Item #03=Sun Gear, mounted to Main Frame.
Item #04=Rotor Output Shaft.
Item #05=Shaft Slip Ring Assembly for Electrical Power Input.
Item #06=Planetary Gears Mounted on Motor Shafts.
Item #07=Planetary Motors.
Item #08=Rotor Assembly Central Hub.
Item #09=Gravitational Masses.
Item #10=Connecting Rods.
Item #11=Stator Shaft Connection Hubs.
Item #12=Rotor End Stanchions.
Item #13=Brush Holders For Planetary Motor Slip Rings.
Item #14=Main Frame Pedestal.
Item #15=Machine Base.

To ensure clarity, and consistency, the same numbering scheme may be used throughout the remainder of this document.

Once assembled, in some implementations, the Rotor Structure (2) and the Rotor Output Shaft (4) may be free to revolve with respect to the Main Frame Assembly (1). For example, this action may be brought about by an interaction of prime movers (in the depicted example, the planetary motors (7)), Planetary Gears (6), meshing with the stationary Sun Gear (3). In some implementations, the structural integrity of the rotor may be insured by the Central Hub (8) and the Rotor End Stanchions (12) to which the rotor proper may be firmly attached.

In this example, counter-torque anchors are provided by the Gravitational Masses (9) in conjunction with Connecting Rods (10) and Stator Connection Hubs (11), in some examples, may provide constant Counter Torques for the Planetary Drive Motors (7). In some implementations, the Planetary Drive Motors (8) may, instead of being rigidly connected to the Rotor Assembly (2), be floating in a gimbal suspension. For example, the gimbal suspension may be provided, as depicted, by floating the Planetary Drive Motors (8) in isolation bearings associated with the special design of the drive motors (7).

Electrical power may, for example, be supplied to the GTA through a series of brushes and slip rings, and a wiring harness which is inserted into the hollow Rotor Output Shaft (4).

In an illustrative aspect, an arrangement in which electric motors, attached directly to planetary gearing, are allowed to orbit a stationary sun gear, while driving a centrally located output shaft. In some implementations, the GTA may include means of mechanically isolating the motor casings from the system carrier arm/link or carrier disk, and coupling same to a gravitationally produced source of counter torque, utilized for the express purpose of allowing each motor stator to perform useful work upon the overall system, as it orbits the Sun Gear.

Figure 3:
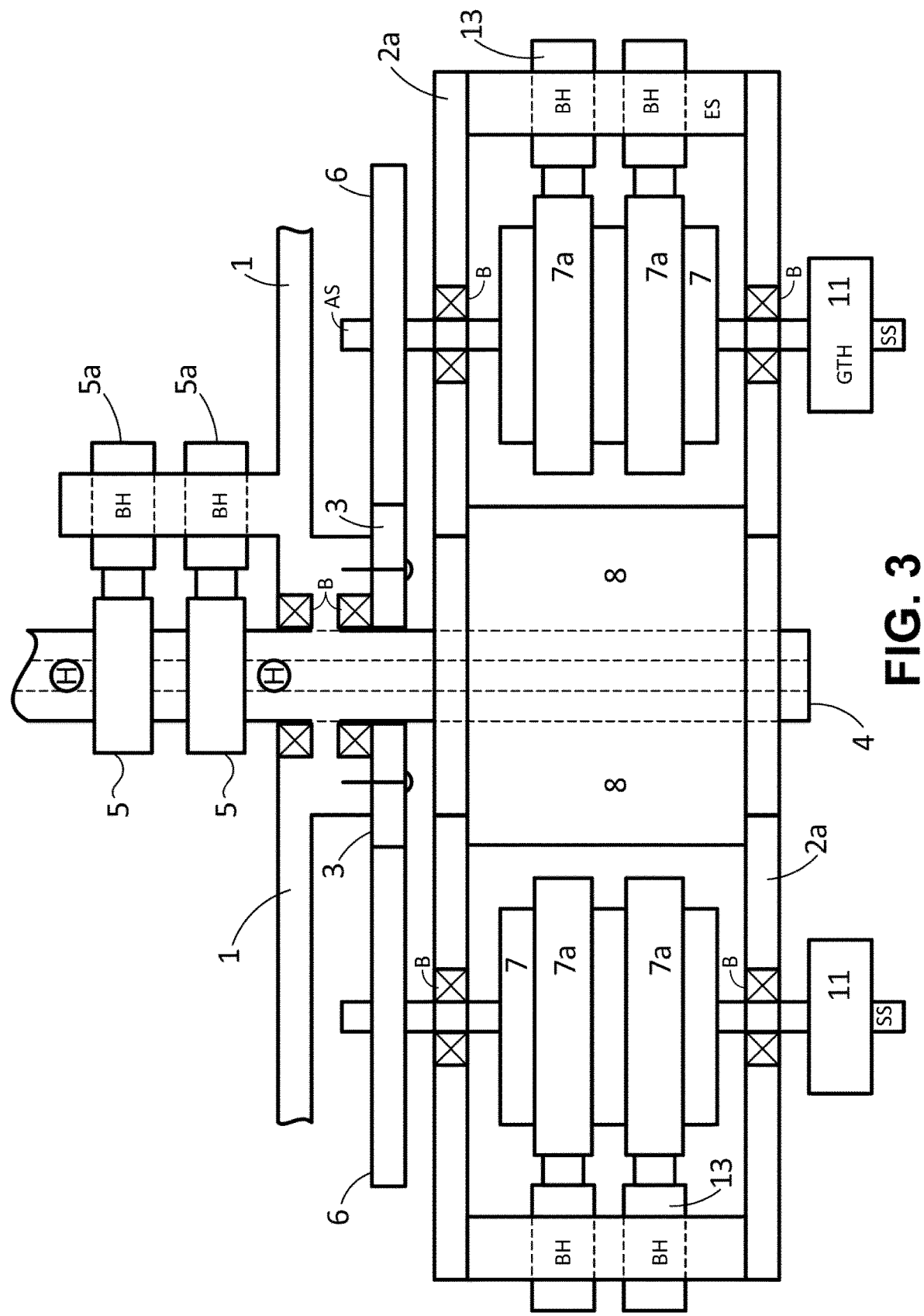
FIG. 3 depicts an exemplary internal diagram of the rotor assembly utilized in the GTA

FIG. 3 depicts an exemplary internal diagram of the rotor assembly utilized in the GTA. In this example, each Planetary Drive Motor (7) (in the depicted example, having an armature shaft (AS) and a stator shaft (SS)) carries a set of brass Slip Rings (7a). For example, the Planetary Drive Motor (7) may receive electrical power from Brushes and Brush Holders (13). In some examples, the electrical power may be channeled down through the hollow Output Shaft (4) via a wiring harness (not shown). For example, the wiring harness may be connected to the Shaft Slip Ring Assembly (5). For example, the Shaft Slip Ring Assembly (5) may receive an electrical excitation from Carbon Brushes (c) and Brush Holders (5a) from an external power supply.

In some implementations, that Sun Gear (3) may be bolted to the Main Frame Assembly (1). For example, the Main Frame Assembly (1) may include several bearings (B) for allowing relative motion between the Main Frame Assembly (1), and the Output Shaft (4). For example, the Output Shaft (4) may, in some implementations, carry the Rotor Assembly (2).

Figure 4:
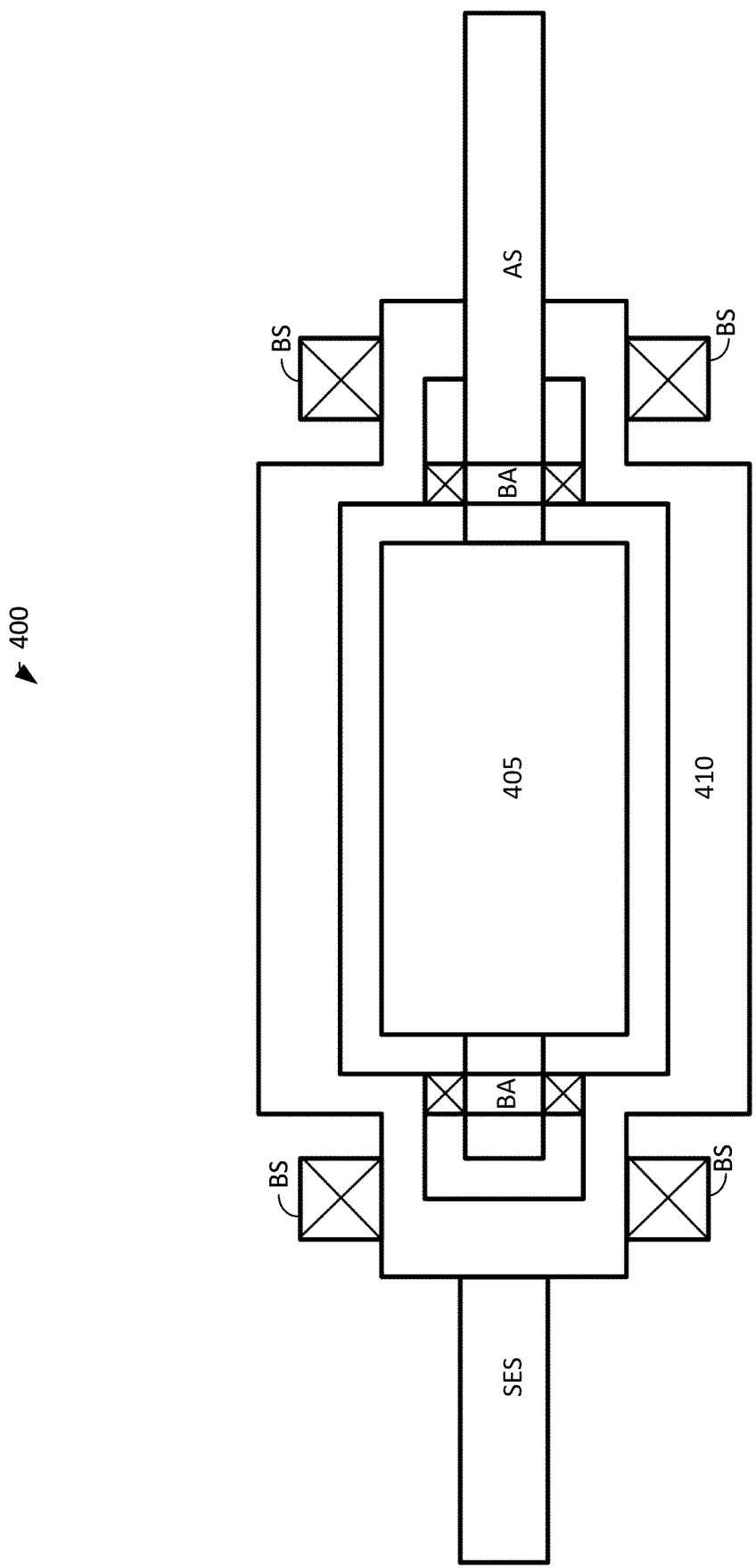
FIG. 4 is a schematic of an internal design of an exemplary Planetary Drive Motor.

FIG. 4 is a schematic of an internal design of an exemplary Planetary Drive Motor 400 (e.g., Planetary Drive Motor 7). In the depicted example, the Planetary Drive Motor includes two output shafts, an Armature Shaft (AS), and a Stator Extension Shaft (SES) (which may, for example, be a Stator Shaft (SS) or an extension of a SS). Two sets of Motor Bearings are, in this example, involved. For example, the Armature Bearings (BA) may allow relative motion between the Motor Armature (405) and the Motor Stator (410). As an illustrative example, a set of Stator Bearings (BS) may allow relative motion between the Motor Stator and the Rotor Assembly (2).

Figure 5:
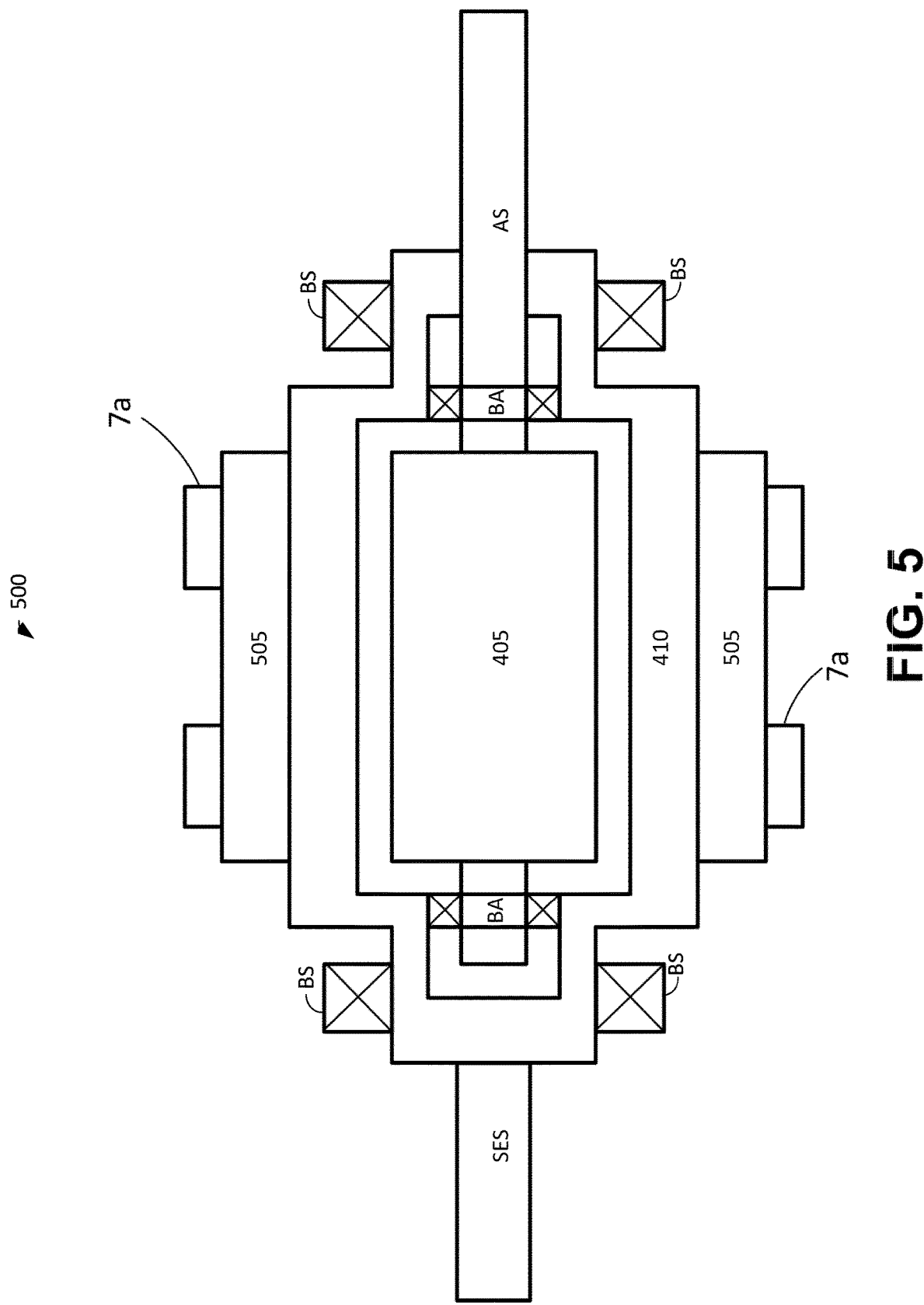
FIG. 5 illustrates an exemplary Planetary Drive Motor configuration used in a GTA.

FIG. 5 illustrates an exemplary Planetary Drive Motor configuration (500) used in a GTA. The Planetary Drive Motor may, for example, be the Planetary Drive Motor 7. The Planetary Drive Motor may, for example, be the Planetary Drive Motor 8. The Planetary Drive Motor may, for example, be the Planetary Drive Motor 400.

In this example, the Planetary Drive Motor includes a sleeve of insulating material (505) placed upon the external surface of each Drive Motor case. For example, the sleeve of insulating material may support two brass Slip Rings (7a). In various implementations, these Slip Rings may allow electrical power to be continuously delivered to each motor as they exhibit relative motion with respect to the Rotor Assembly (2) and the Main Frame Assembly (1).

Figure 6:
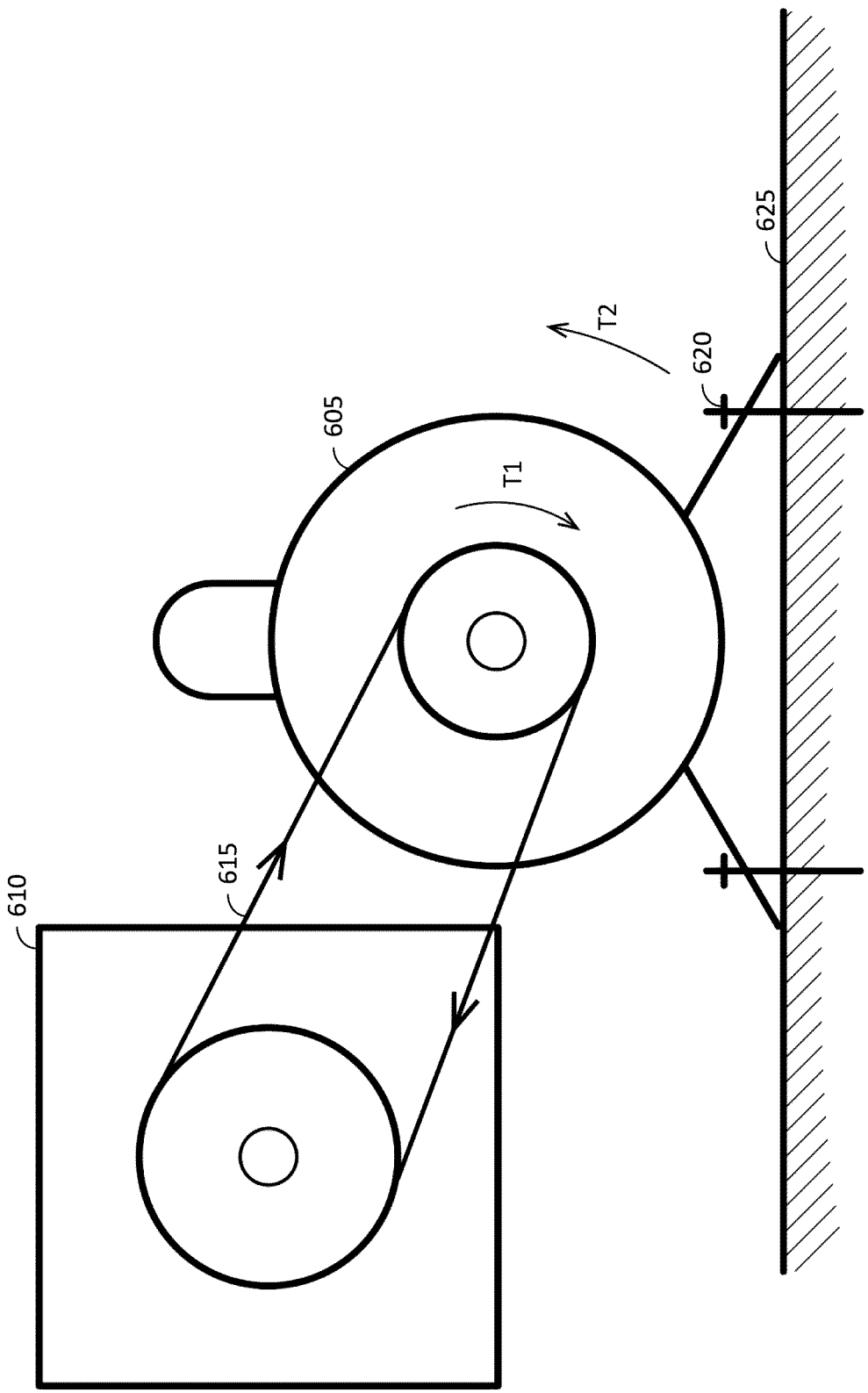
FIG. 6 illustrates an exemplary standard electric motor with exemplary indications of a relative torque.

FIG. 6 illustrates an exemplary standard electric motor 605 with exemplary indications of a relative torque. The electric motor 605, in this example, is attached by fasteners 620 (e.g., bolts) to an unmovable surface 625, and applying mechanical power to a mechanical load 610, by means of a Torque delivered through appropriate drive member(s) 615 (e.g., pulleys and a belt, sprockets, and/or a chain).

In accordance with Newton's Third Law of motion, as applied to angular systems, the application of a Torque to any rotating load may see the production of a counter-Torque, which simultaneously acts upon the source of the torque, in the opposite direction. Torque, like force, is therefore created in pairs. In the depicted example, the electric motor is bolted to the supporting surface to prevent an angular acceleration of the motor frame itself. For example, the summation of the total angular work done by the motor, may then be expressed as follows:

$$\Sigma W = (T_1 \theta_1) + (T_2 \theta_2), \text{ where}$$

$T_1$=Armature Torque.
$\theta_1$=Armature Angular Displacement=$2\pi$ Radians.
$T_2$=Stator Torque.
$\theta_2$=Stator Angular Displacement=$0\pi$ n Radians, and
$T_2$=$(-T_1)$.
In which case, $$\Sigma W = (T_1 \, 2\pi) + (-T_1 \, 0) = (T_1 \, 2\pi)$$

From the above, the mathematical expression indicates that work may be done by the Motor Armature, in this example. There may also be many examples of such a motive system in which the total work done is equally shared between the Armature and the Stator.

Figure 7:
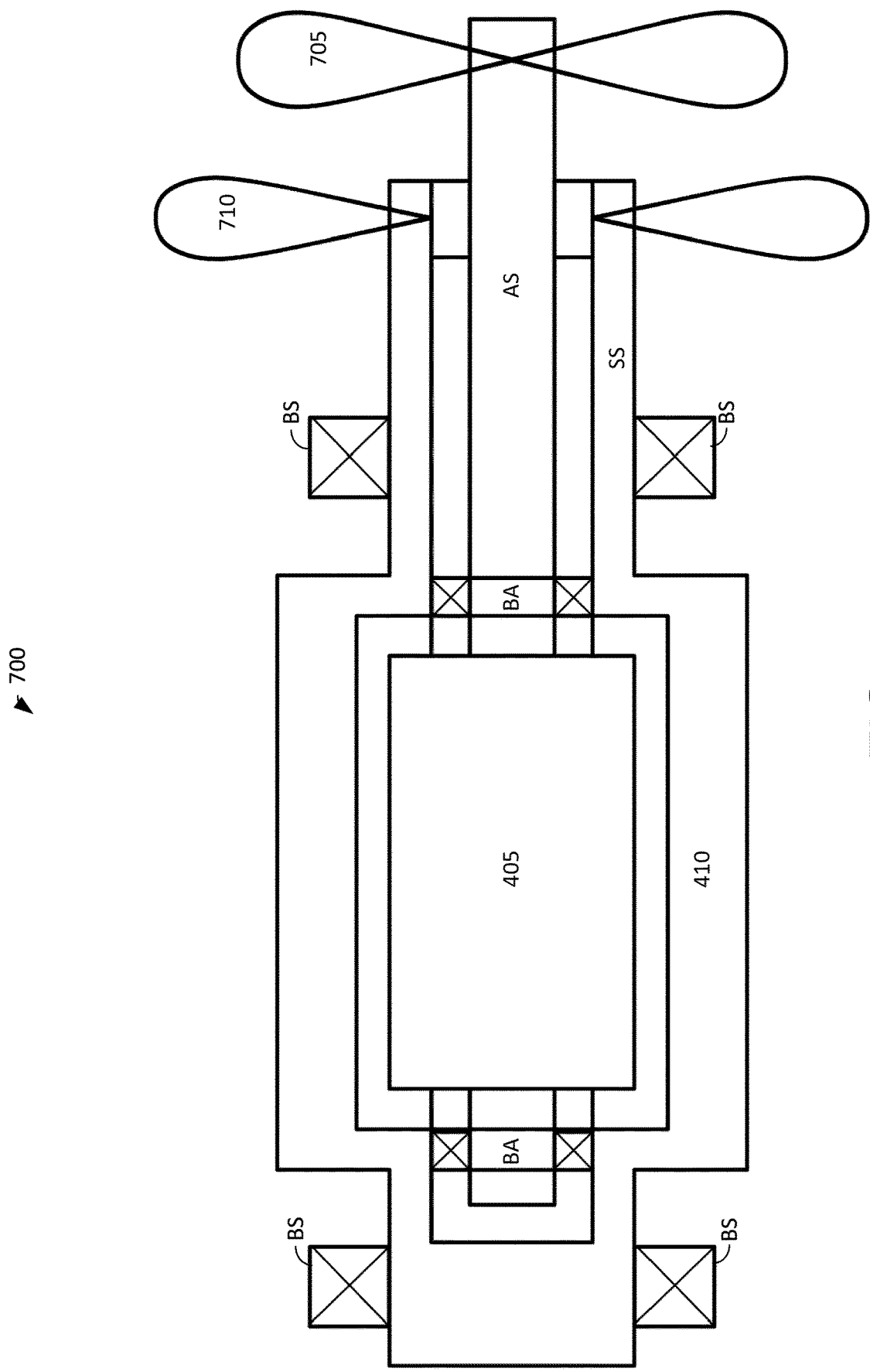
FIG. 7 is a schematic diagram of an exemplary Naval Torpedo's propulsion system.

FIG. 7 is a schematic diagram of an exemplary Naval Torpedo's propulsion system 700. For example, military torpedoes may include dual propellers (e.g., as depicted, an armature propeller 705 and a stator propeller 710) separately driven by the armature and stator components of the onboard prime mover. For example, the stator propeller may act as a counter-torque anchor. In some implementations, by way of example and not limitation, these arrangements may not employ epicyclic gearing, an orbiting plurality of drive motors. By way of example and not limitation, some implementations may not employ any form of gravity-generated counter torque mechanism. In such implementations, for example, the resulting angular velocities of each component may be, for example, co-axial, and the moments of inertia may be matched to avoid production of gyroscopic moments in the body of the torpedo, which would greatly inhibit its guidance.

In this example, the Motor Stator Assembly includes two bearings (BA). For example, the bearings (BA) may allow a relative motion between the Motor Armature and the Motor Stator, as described with reference to FIG. 4. The Stator structure includes, in this example, a second set of bearings (BS). The second set of bearings (BS) may, for example, allow for a relative motion between the Torpedo Hull, and the Stator of the propulsion motor. In some implementations, this arrangement may de-couple the propulsion system from the body of the weapon.

In some examples, the propellers may include opposite pitches on their blades to provide (e.g., substantially only) a forward motion. For example, the on-board motor may make equal contributions of work from the Motor Armature, and the Motor Stator, according to the following relationship:

$$\Sigma W = (2T_1 \, 2\pi/2)/2 + (-2T_2(-2\pi/2))/2 = T\theta$$

For example, the available torque on each component may be doubled when an angular speed is reduced by half, according to the above relationship. For example, the total work may be conserved. For example, both motor members may do equal amounts of work while the total work done may remain unchanged. Utilizing this information, for example, one implementation may be the motor arrangement as described with reference to FIGS. 4-5.

Figure 8:
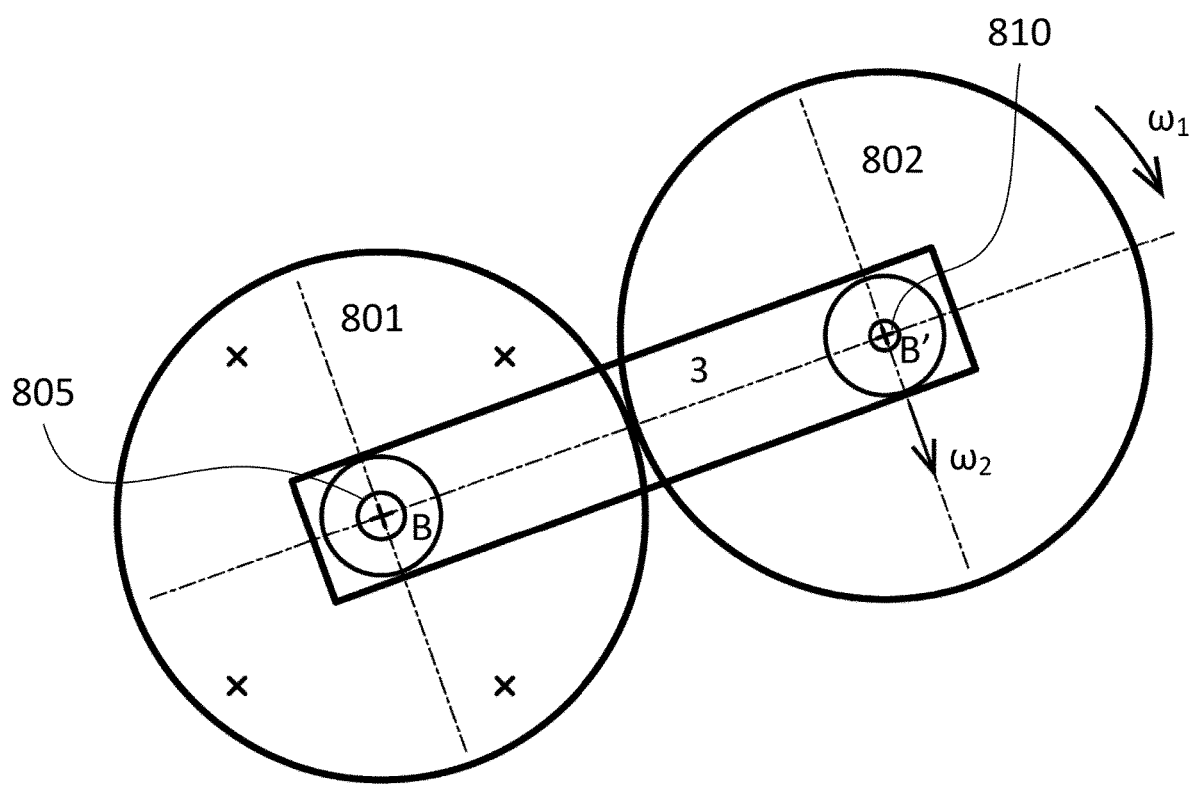
FIG. 8 shows an exemplary three element epicyclic planetary gearing system (PGS).

FIG. 8 shows an exemplary three element epicyclic planetary gearing system (PGS). The three element epicyclic PGS includes a stationary Sun Gear (801), an orbiting Planetary Gear (802), and a Carrier Link (803). For example, the Carrier Link (803) may maintain a proper center-to-center distance between gears. In one example, the Carrier Link (803) may transmit mechanical Torque from the Planet Gear to the output shaft (805) located at the center of the Sun Gear. For example, the Planet Gear and the Sun Gear may remain in constant mesh. In some implementations, the Planet Gear and the Sun Gear may have a one to one ratio, with respect to one another, although other ratios may be possible.

In some implementations, for example, the PGS shown in FIG. 8 may be implemented in various embodiments. For example, the PGS may be implemented in the embodiment shown in FIG. 1, The Sun Gear (801) may, for example, be implemented as the Sun Gear (3) in FIG. 1. The Planet Gear (802) may, for example, be implemented for Planet Gears (6). A Carrier Link (803) may, for example, be coupled between the Sun Gear (3) and one or more of (e.g., each of) the Planet Gears (6). For example, N planetary gears may each be coupled to the Sun Gear (3) by a corresponding Carrier Link (803) of N carrier links.

In various implementations, each gear may be equipped with a central bearing. For example, the Sun Gear utilizes a bearing (B) to allow for relative motion of the Link (803). For example, the bearing may be attached to the Output Shaft (805), with respect to the stationary Sun Gear (801). For example, the Planet Gear (802) may utilize a bearing (B') to allow for relative motion between its own Drive Shaft (810) and the connecting Carrier Link (803).

In one example, the prevailing epicyclic relationship may be expressed as follows:

$$\omega_{21}=\omega_{31}+\omega_{23}$$

which means, the angular velocity of the Planet (802), with respect to the Sun (801), is equal to the angular velocity of the Carrier Link (803) (e.g., a Carrier Arm), with respect to the Sun (801), plus the angular velocity of the Planet (802), with respect to the angular velocity of the Carrier Link (803), in this example. As an illustrative example, the Planet (802) may make two turns about itself, with respect to the Sun (801) for the Carrier (803) and the output shaft, to revolve once about the Sun (801), despite the one to one ratio between (801) and (802). This action may be, for example, under the influence of a Prime Mover located in the reference plane of the observer, and central to the Sun Gear.

Suppose the above equation is now solved for the angular quantity ($\omega_{23}$), then, $$\omega_{23}=\omega_{21}-\omega_{31}, \text{ or numerically, (1 turn=2 turns-1 turn)},$$

As an illustrative example, one rotation of Planet (802), with respect to the Carrier Link (803), may produce one rotation of the Carrier (803), with respect to the Sun Gear (801). Accordingly, for example, a one to one ratio between the planet, and the output shaft, may be obtained if the source of rotation may be maintained within the reference frame of the Carrier, and not the reference frame of the observer, or the Sun Gear (801). In some examples, a turns advantage may be enjoyed if the drive motor is situated in a rotating reference frame.

Figure 9:
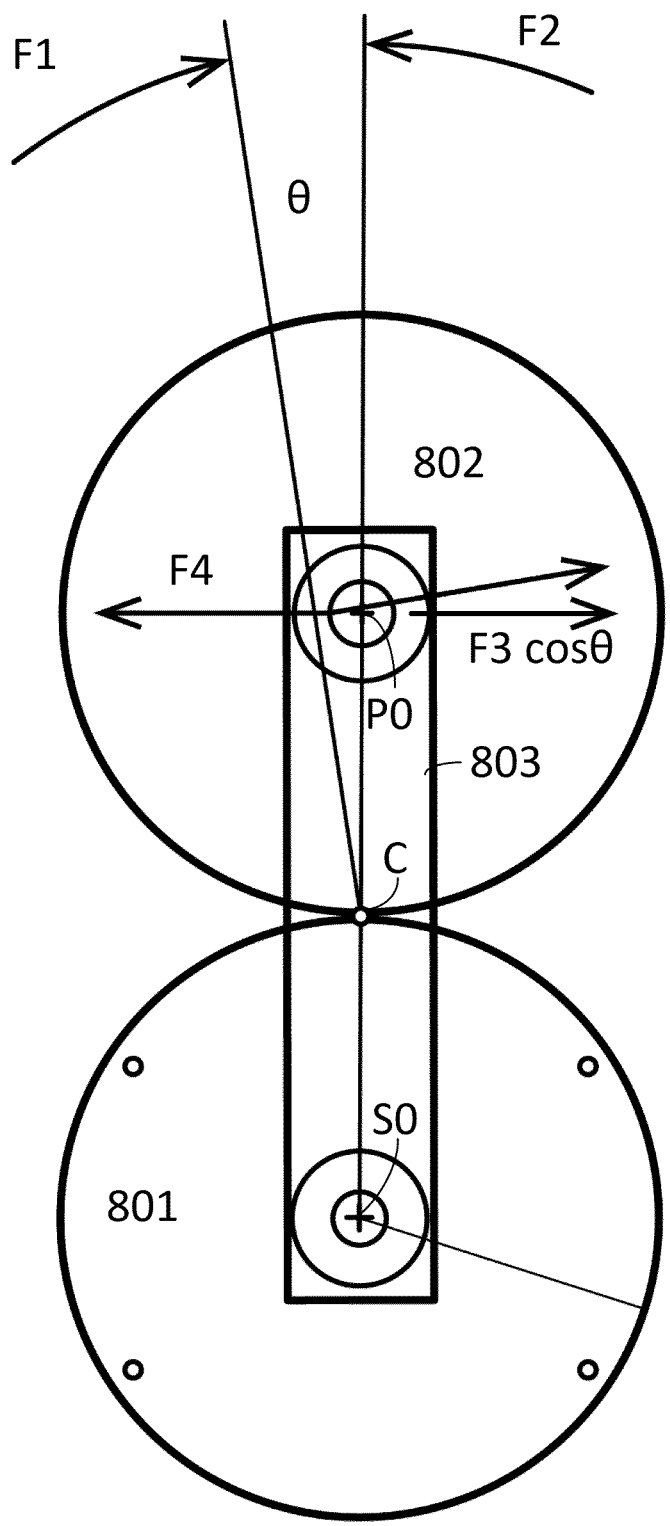
FIG. 9 shows an exemplary relationship between Forces and Torques that arise when an exemplary Planetary Drive Motor is rigidly secured to a Connecting Arm in the three element epicyclic PGS.

FIG. 9 shows an exemplary relationship between Forces and Torques when an exemplary Planetary Drive Motor is rigidly secured to a Connecting Arm in the three element epicyclic PGS. In this example, a drive motor driving the Planet Gear (802) is coupled to the Carrier Link (803). As depicted, the motor moves the Carrier Link (803) by virtue of the Planet Gear (802).

$F_1$ and $F_2$ represent the magnetic forces operating within the drive motor proper, and acting upon lever arms $L_1$, and $L_2$ respectively. For example, a torque produced by ($F_1 \times L_2$) may be taken about the mesh point (c) of the two gears. For example, the torque may give rise to ($F_3$). For example, the torque produced by ($F_2 \times L_1$) may give rise to ($F_4$) (e.g., operating through a point $P_0$, as depicted). In the depicted example, the magnitude of $F_4$ may, for example, be −18.333 lbs. As an illustrative example, the magnitude of the positive force component, $F_3 \cos \theta = 26.5322$ lbs. For example, a net force may be 8.1992 pounds acting upon the link length of 6 inches. For example, an output torque of 49.1934 inch lbs may be produced about a point ($S_0$). The point ($S_0$) may be an output shaft, for example.

Figure 10:
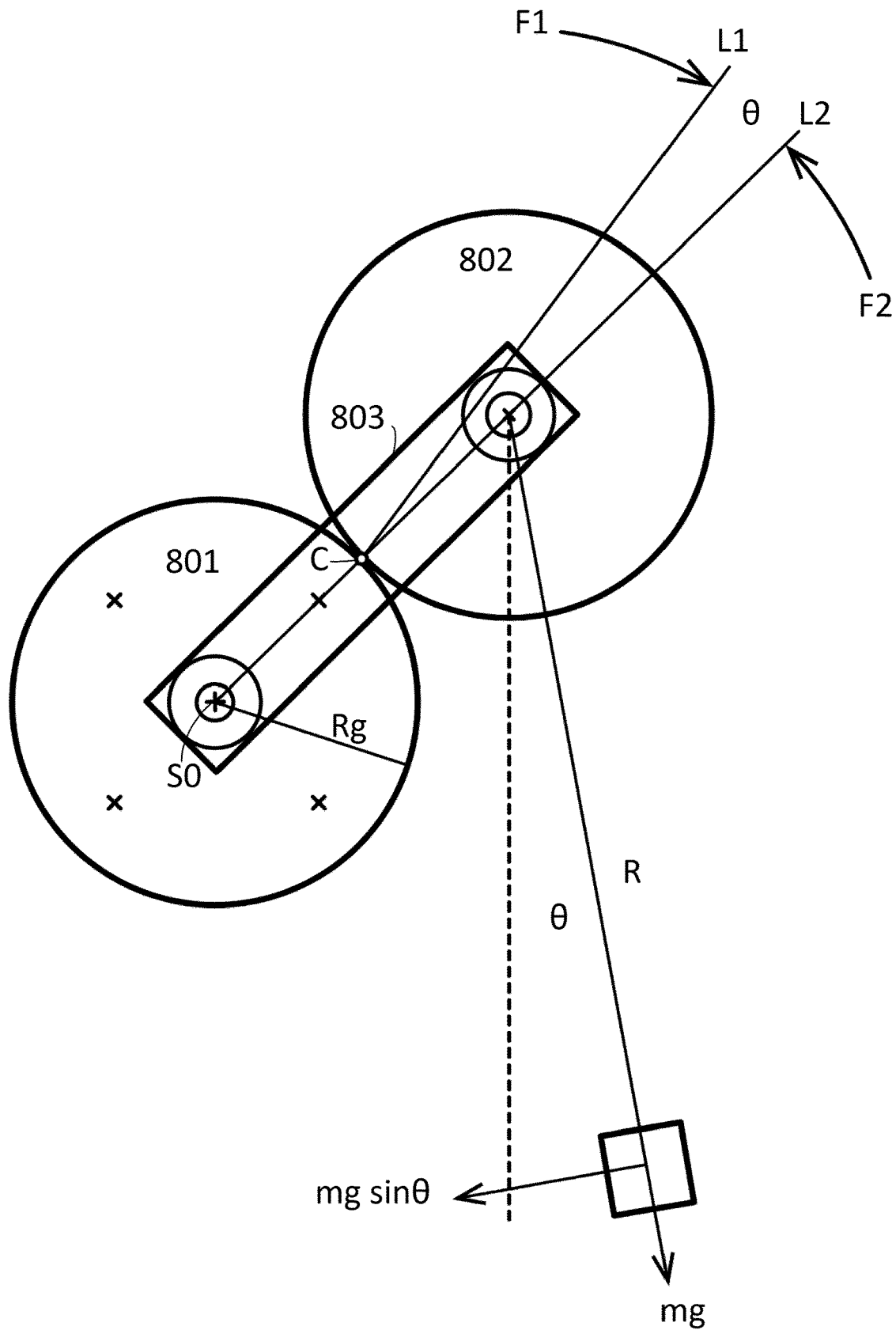
FIG. 10 provides an exemplary arrangement for a GTA utilizing a Gravitational Anchor System to provide Counter-Torque isolation from the Carrier Link.

FIG. 10 provides an exemplary arrangement for a GTA utilizing a Gravitational Anchor System to provide Counter-Torque isolation with respect to the carrier link. In the depicted example, in some implementations, the Gravitational Anchor System includes an isolated gravitational torque "anchor" to provide a counter-torque mechanism for each drive motor.

As an illustrative example, the GTA in FIG. 10 may include dimensions and applied forces, provided as an example for calculation, substantially the same as described in FIG. 9. Other dimensions and/or ratios are contemplated. In this example, the drive motor (not shown) is floating with respect to the Carrier Link. For example, a counter torque may be supplied by means of a mass suspended by a connecting rod which is attached to the Drive Motor Stator Shaft Extension.

In this example, there is no secondary torque component imposed upon the Carrier Link (803). For example, the net torque developed about point $S_0$, the total available torque, may be calculated:

$$\Sigma T = 0 \text{ (No Acceleration, Steady State)}$$

$$T_{S_0} - [mgR(\sin \theta)/L_2]L_1 = 0$$

$$T_{S_0} = [mgR(\sin \theta)/L_2]L_1, \text{ and}$$

$$T_{S_0} = 110 \text{ inch } Lbs$$

Under these conditions, the torque yield at point ($S_0$) is 100%, for example. In some implementations, an increase in Torque delivery may advantageously be obtained without a reduction in angular velocity. In some examples, the angular speed of the Planet Gear (802) with respect to the Carrier Link (803) may be the same angular speed of the Carrier Link (803) with respect to the Sun Gear (801). In this example, a 1 to 1 Speed ratio may be measured accompanied by a 2 to 1 Torque ratio.

Figure 11:
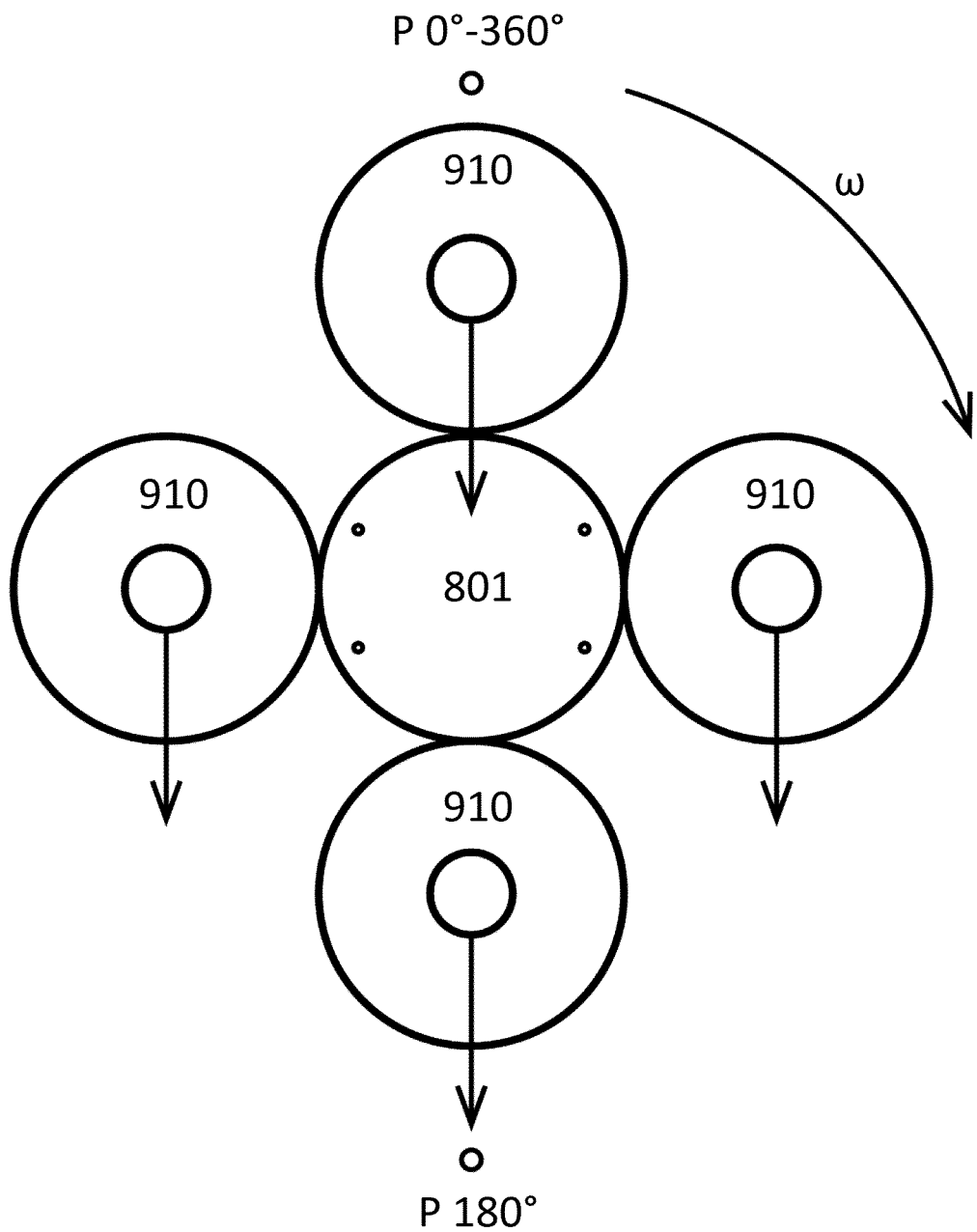
FIG. 11 illustrates exemplary orbital characteristics exhibited by each motor case during one complete revolution around the stationary Sun Gear.

FIG. 11 illustrates exemplary orbital characteristics exhibited by each driver motor case (910) (e.g., corresponding to a prime mover, corresponding to a motor driving Planet Gear (802), corresponding to Planetary Motors (7)) during a complete revolution around the stationary Sun Gear (801). For example, the position of the driver motor case may progressively be shown at angular increments of ninety degrees, which is highlighted by comparing the (mg) vector to a reference point (P), which is located upon the rotor frame (Frame not shown).

Accordingly, the motor case may make one rotation about itself as it orbits the Sun Gear. For example, a Grav-Tap motor case may move through an angle of $2\pi$ radians, under the influence of a large torque, as it travels. In some implementations, an angular speed of each motor component may remain unchanged, in the motional reference frame, rather than being reduced by a factor of two, in an observer reference frame.

Mathematically, this increase in the available work function can be described as follows:

$$\Sigma W = ((T_1)(2\pi)) + ((-T_2)(-2\pi))$$

$$\Sigma W = [(T_1 2\pi) + (T_2)(2\pi)]$$

$$\Sigma W = (2\pi)[T_1 + T_2], \text{But } T_1 = T_2, S_0(T_1 + T_2) = 2 T_1, \text{ and } 2\pi = \theta, S_0$$

$$\Sigma W = 2 [T_1 \theta]$$

For example, the above may be accomplished without any violation of the Conservation Laws, but rather, a strict adherence to the rules of epicyclic engineering. Proper functioning, in some implementations, may rely upon the relative positions of the Gravitational Anchors with respect to the direction of the Earth's gravitational field.

Figure 12:
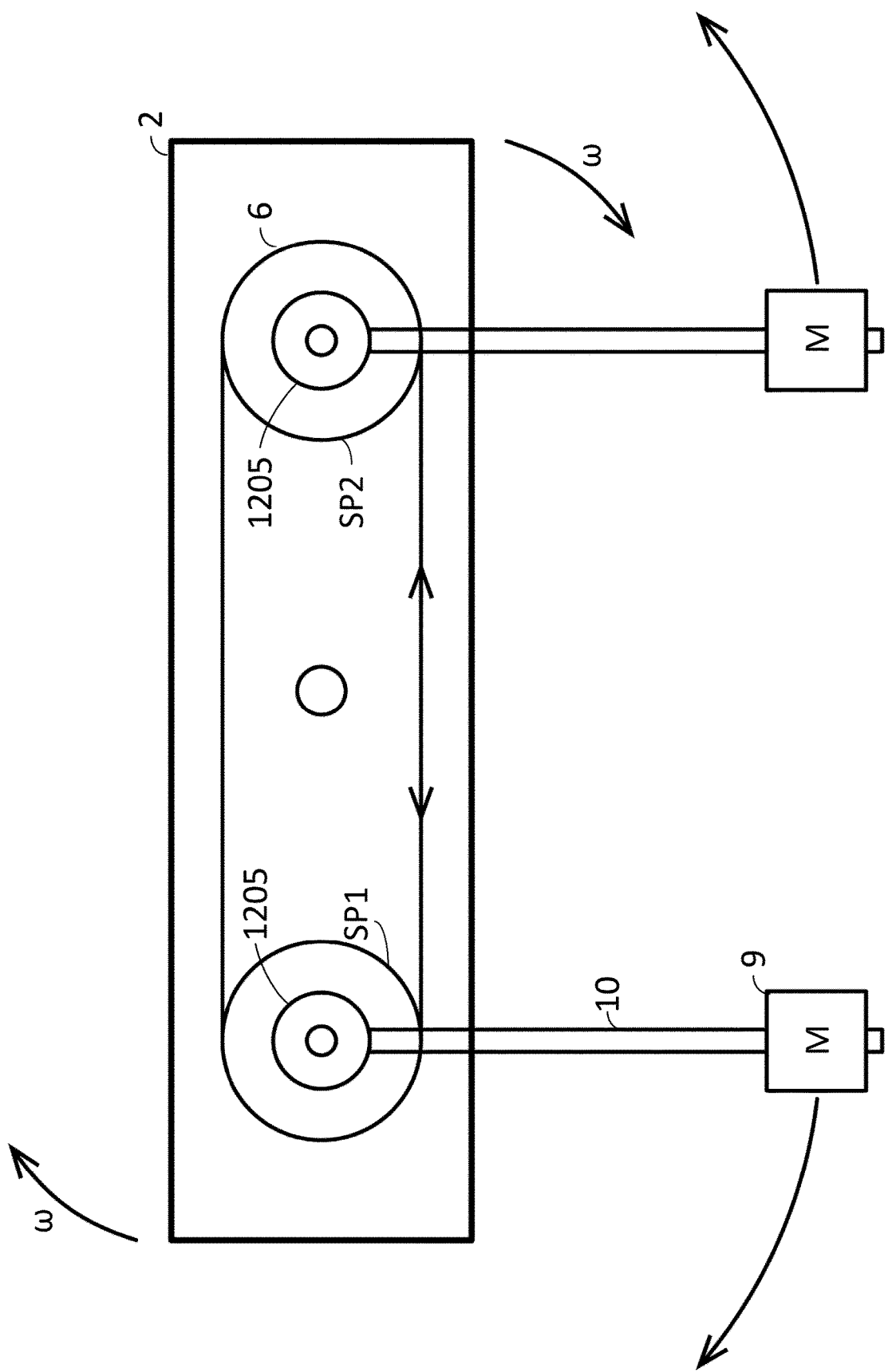
FIG. 12 shows exemplary effects of centrifugal force upon the Gravitational Anchors.

FIG. 12 shows exemplary effects of centrifugal force upon Gravitational Anchors. In this example, the Stator Shaft Extensions from each Drive Motor may be fitted with engagement members (e.g., Sprocket Gears) SP1 and SP2. For example, the sprocket gears may be linked together by an orientation constrain member (e.g., a snug chain).

In some implementations, a hub 1205 may be included behind each sprocket gear. The hub, may, for example, be mounted upon the stator extension shaft. For example, each hub may support a connecting rod and a gravitational mass. As the rotor begins to spin, for example, the angular acceleration may cause an appearance of "forces" to cause a spreading of the gravitational masses. Such actions may, for example, cause a great reduction in the magnitude of the counter torque supplied by the Gravitational Anchors. However, the centrifugal forces associated with the counter torque may induce opposing forces within the sprocket chain. For example, the opposing forces may neutralize the spreading effect, and restrict the movement of the masses to simple harmonic motions (only) in the vertical direction.

For example, if the Gravitational Anchors (labeled as "mass") were to go horizontal, gravitational advantages may disappear and all forces may, for example, become internal. Without being bound by a particular theory, Newton's Second Law indicates that work cannot be applied externally by a system having only internal forces. Accordingly, various implementations may advantageously maintain the Gravitational Anchors in a desired configuration (e.g., vertical) by configuring the sprockets and chain, as depicted, to induce opposing forces in the chain that cancel out each other, thereby reducing or preventing undesired displacement of the Gravitational Anchors out of the desired orientation.

Figure 13:
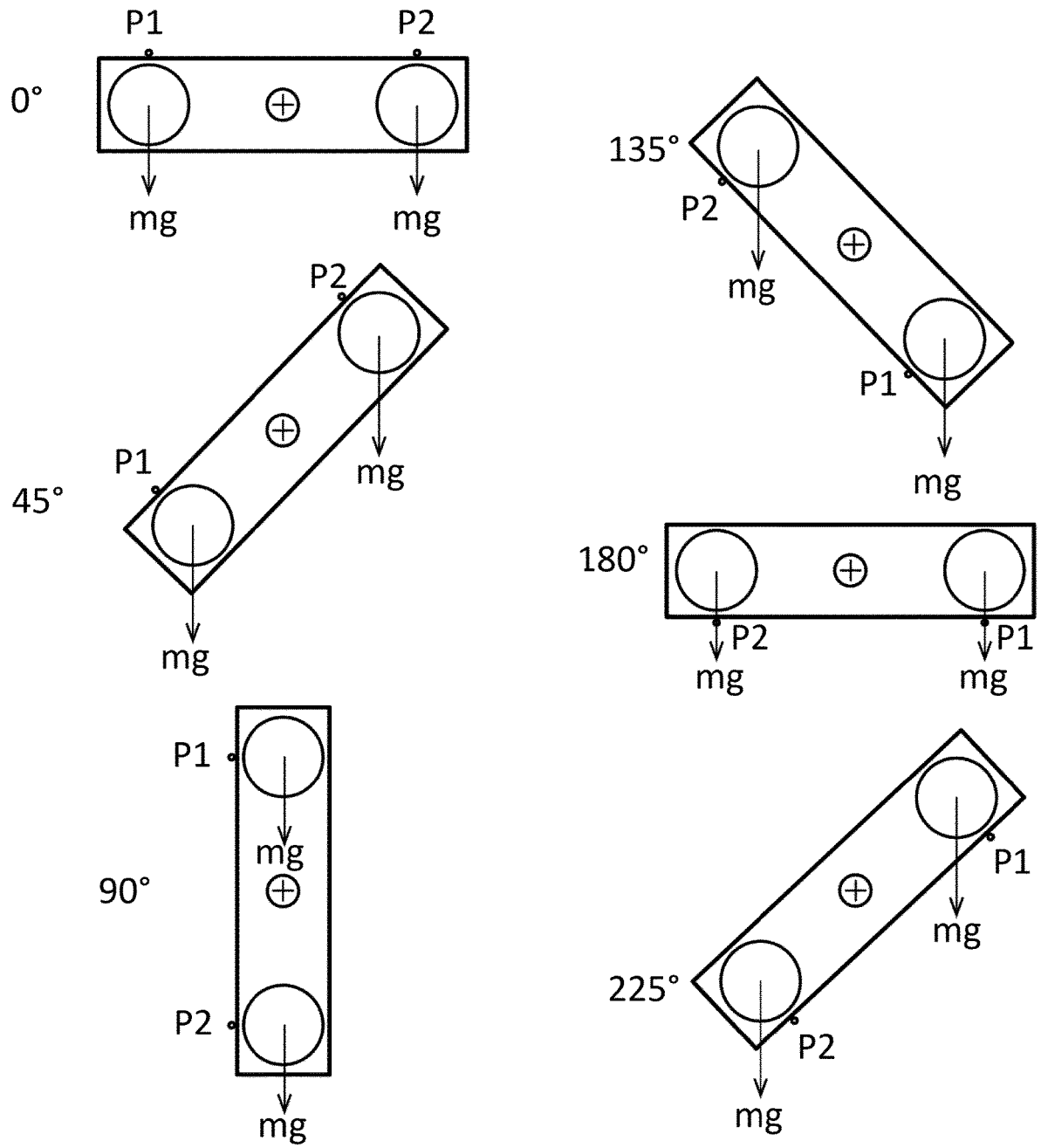
FIG. 13 demonstrates exemplary progressive rotor positions

FIG. 13 demonstrates exemplary progressive rotor positions (e.g., of the apparatus depicted in FIG. 12). In this example, six successive Rotor positions are 45 degrees apart. For example, no sprockets nor chain may have been installed upon the Rotor. However, the gravitational vectors (mg) may be synchronized as the Rotor structure turns, for example. True angular displacement may be obtained by comparing the (mg) vectors with reference points P1 and P2 in each position. For example, the addition of Sprockets and a chain may have no effect whatsoever upon the hubs, the connecting rods or the gravitational masses. When Centrifugal forces begin to act, then, for example, the sprockets and chain may provide a force cancellation.

In some implementations, this method of Centrifugal Nullification works well, for example, with small prototypes utilizing a two Planetary Drive Motors. In some embodiments, another method may be used as a practical solution for the Gravitational Torque Amplifiers which may utilize multiple Planetary Drive Motors. In various implementations, the Gravitational Torque Amplifiers may also utilize multiple Gravitational Anchors.

Figure 14:
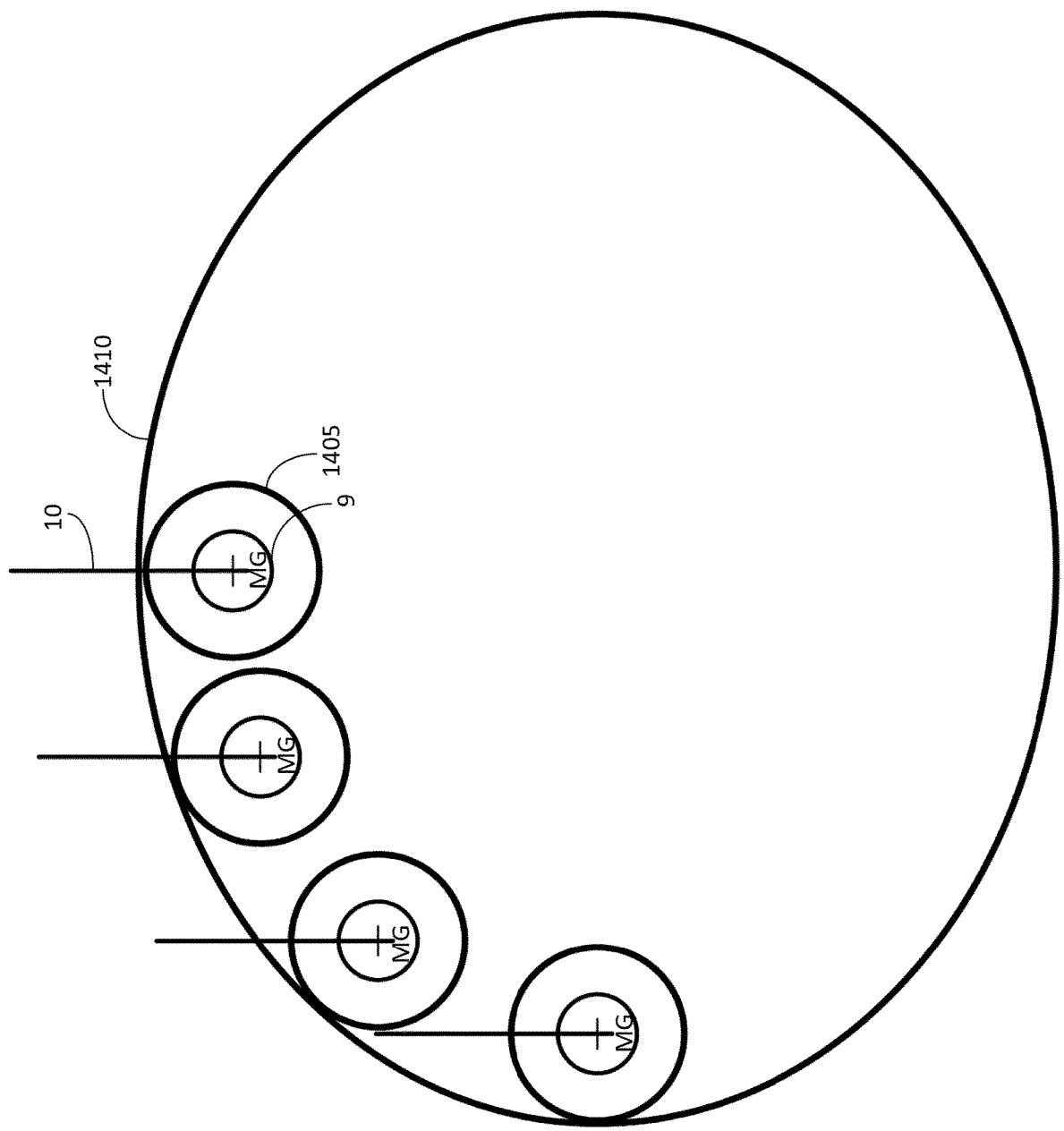
FIG. 14 teaches an exemplary method of Counter-Torque Isolation using an internal cam.

FIG. 14 teaches an exemplary method of Counter-Torque Isolation. In some examples, a mechanical rendering of a Cam and Follower System may be employed to control the Centrifugal Force components in a multi-motor epicyclic system. In some implementations, each Drive Motor may include with a Stator Extension Shaft, a Shaft Hub, a Connecting Rod, and a Gravitational Mass, (MG). As depicted, for example, the guide track (e.g., cam) and follower(s) may be implemented as an orientation constraint member(s).

The Gravitational Masses may, for example, each include a roller-follower wheel (1405). For example, the roller-follower wheel may impinge upon a guide-track (1410) (e.g., an internal, Elliptical Cam). For example, the Elliptical Cam may restrict the motion of the Gravitational Masses and associated Connecting Rods to a form of Simple Harmonic Motion, in a vertical direction. For example, this arrangement may be capable of supplying Gravitational Counter-Torque to a Multi-Drive Motor embodiment of the GTA.

Figure 15:
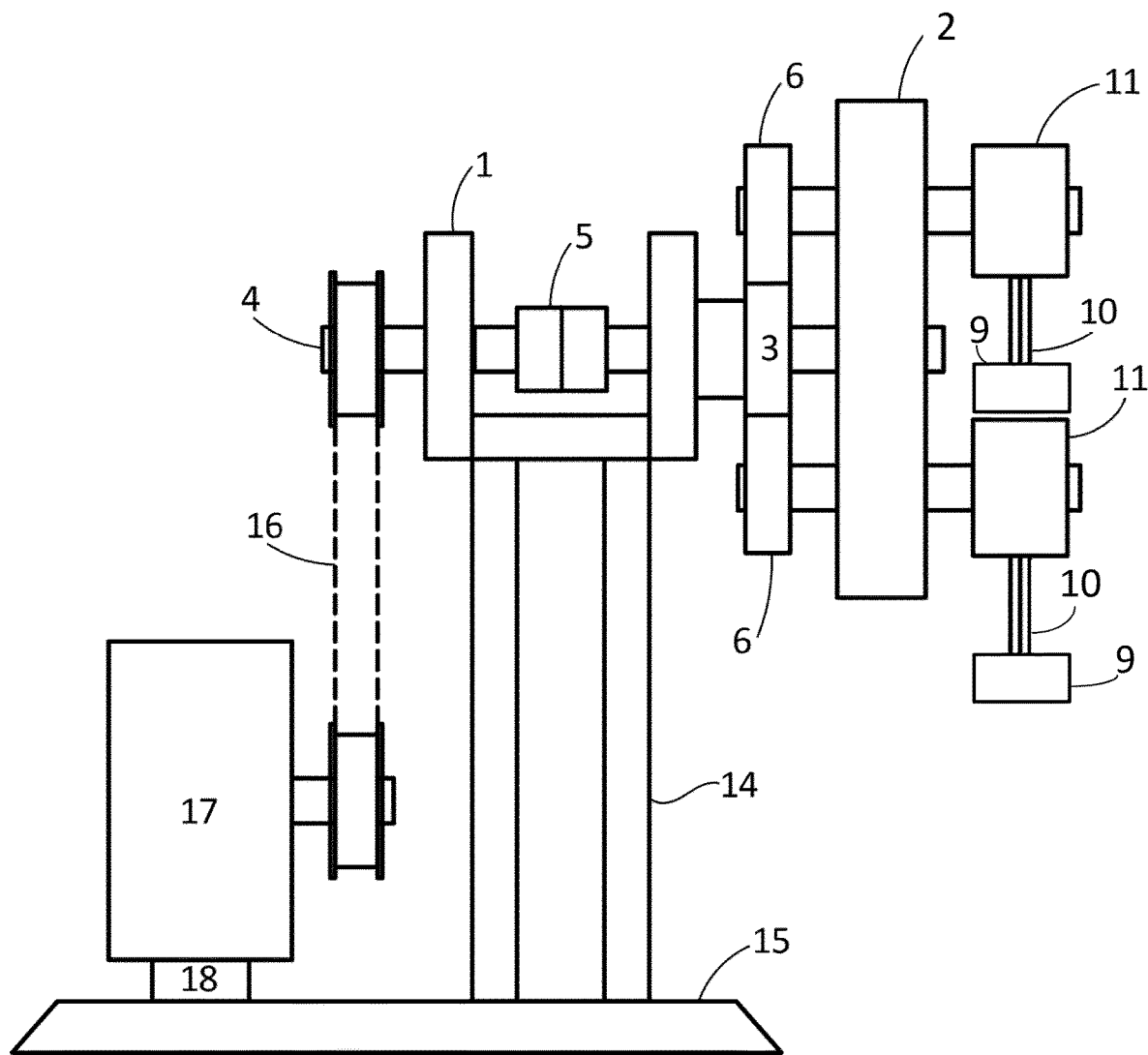
FIG. 15 depicts a side view of an exemplary GTA.

FIG. 15 depicts a side view of an exemplary GTA. In this example, an output power is directed to animate a practical load. In this example, the GTA includes three added items to the GTA described with references to FIG. 1, namely 16, 17 and 18, which represent output pulleys and belt, mechanical load, and load pedestal, respectively. In some implementations, the mechanical load may include any rotating device having an applied torque to promote its function, such as a Hydraulic Pump, an Electric Generator, or a Ships Propeller.

Figure 16:
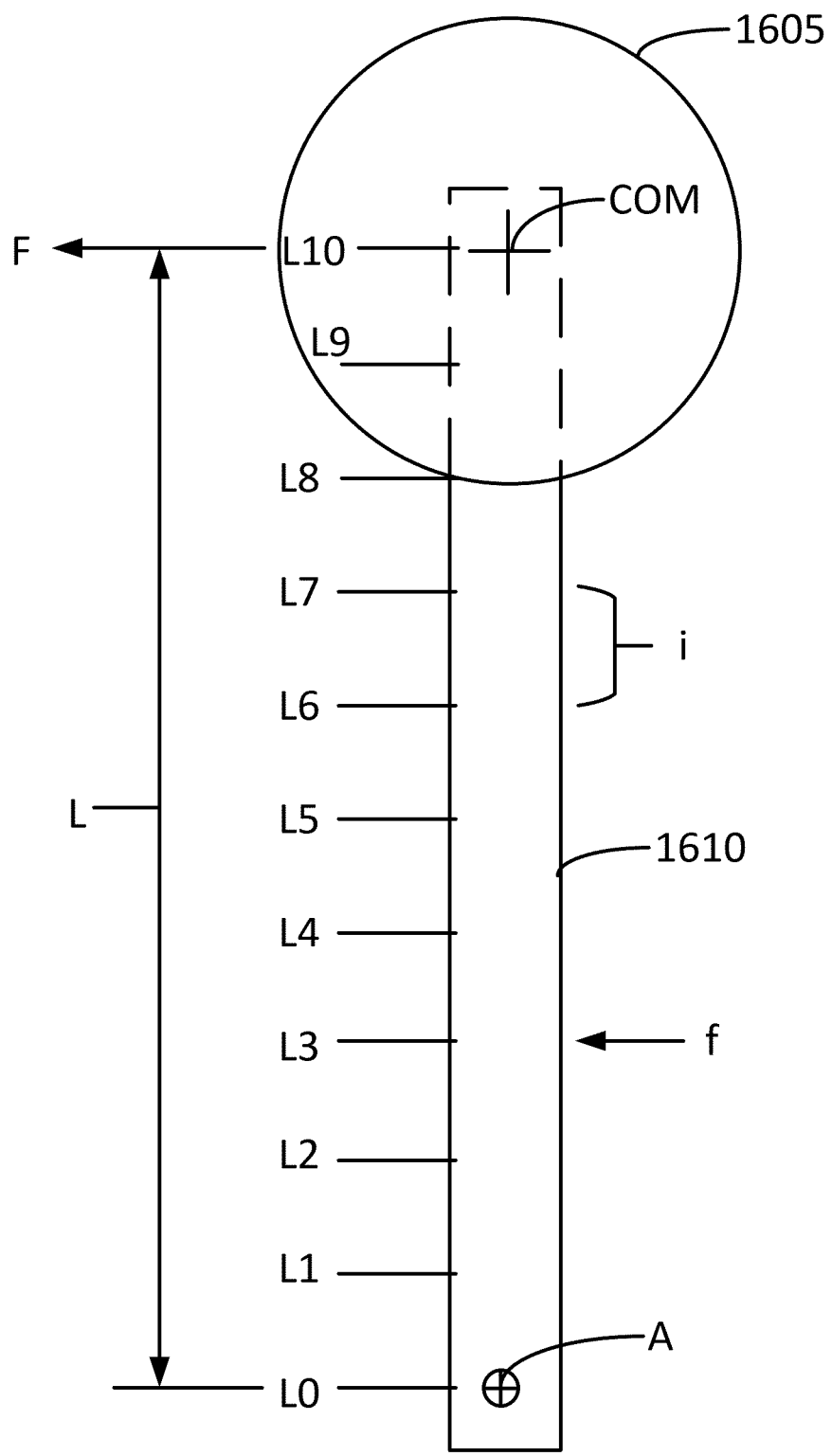
FIG. 16 depicts an illustrative analysis of position of mass about an axis relative to moment of inertia.

FIG. 16 depicts an illustrative analysis of position of mass about an axis relative to moment of inertia. In the depicted example, a mass 1605 is disposed at a length L from an axis A (e.g., axis of rotation) along a lever arm 1610. The mass 1605 may, for example, be a disk. The mass 1605 may, for example, have a mass m. A center of mass of the mass 1605 is labeled, in this illustration, as "COM".

The lever arm 1610, as depicted, is gradated in intervals "i" along the length L, from i=0 to i=N (where i=10 in this example). An applied force is denoted as "f". An output force is denoted by "F". By way of example and not limitation, the mass may be a mass relative to an output shaft (e.g., Rotor Output Shaft (4) as depicted at least with respect to FIG. 1). For example, the COM may represent an idealized center of mass of a rotating system about the output shaft. The applied force may be applied by a prime mover (e.g., a Planet Gear (7)). The lever arm 1610 may, for example, be embodied as a portion of the Rotor Structure (2).

As an illustrative example, suppose that f=10 lbs of force, applied perpendicularly to the lever arm 1610. Suppose that L0 through L10 are one inch intervals. Suppose T0 through T10 denote torques developed about axis A. Suppose that L is a directed distance from axis A to the COM. In that case, then, the torques developed about the axis A, and the corresponding forces delivered to the COM are shown in TABLE 1, below:

TABLE 1

| TORQUES ABOUT AXIS A | FORCE DELIVERED TO COM |
|---|---|
| T0 = f * L0 = 0 inch-lbs | F = T0/L = f * L0/L = 0 lb |
| T0 = f * L1 = 10 inch-lbs | F = T1/L = f * L1/L = 1 lb |

TABLE 1-continued

| TORQUES ABOUT AXIS A | FORCE DELIVERED TO COM |
|---|---|
| T0 = f * L2 = 20 inch-lbs | F = T2/L = f * L2/L = 2 lb |
| T0 = f * L3 = 30 inch-lbs | F = T3/L = f * L3/L = 3 lb |
| T0 = f * L4 = 40 inch-lbs | F = T4/L = f * L4/L = 4 lb |
| T0 = f * L5 = 50 inch-lbs | F = T5/L = f * L5/L = 5 lb |
| T0 = f * L6 = 60 inch-lbs | F = T6/L = f * L6/L = 6 lb |
| T0 = f * L7 = 70 inch-lbs | F = T7/L = f * L7/L = 7 lb |
| T0 = f * L8 = 80 inch-lbs | F = T8/L = f * L8/L = 8 lb |
| T0 = f * L9 = 90 inch-lbs | F = T9/L = f * L9/L = 9 lb |
| T0 = f * L10 = 100 inch-lbs | F = T10/L = f * L10/L = 10 lb |

Accordingly, it can be seen that, as the point of application of the force "f" approaches the COM, the force applied to the COM approaches a maximum value equal to the applied force "f". Thus, f=F (the output force) at the COM of the system. As such, it can be seen that COM represents, in some implementations, a target (e.g., 'optimal') position to apply an accelerating force.

The impact of the location of the application of the force "f" relative to the COM on the moment of inertia of the system is demonstrated in TABLE 2, below. The moment of inertia "I" can be calculated by:

$$I = MR^2 = ML^2$$

where M is the mass, and R is the distance of the center of mass of the mass M to the axis of rotation. Because R effective = $(L/Li)^2$, then $I_{effective} = M (L/Li)$, where Li is the distance at which "f" is applied from the axis of rotation (e.g., L1 . . . L10).

Accordingly, the effective moments of inertia for the example given above are illustrated in TABLE 2, below:

| EFFECTIVE MOMENT OF INERTIA |
|---|
| $5 (L/L1)^2 = 5 (10/1)^2 = 500.00\ MR^2$ |
| $5 (L/L2)^2 = 5 (10/2)^2 = 125.00\ MR^2$ |
| $5 (L/L3)^2 = 5 (10/3)^2 = 55.500\ MR^2$ |
| $5 (L/L4)^2 = 5 (10/4)^2 = 31.250\ MR^2$ |
| $5 (L/L5)^2 = 5 (10/5)^2 = {}^20.000\ MR^2$ |
| $5 (L/L6)^2 = 5 (10/6)^2 = 13.888\ MR^2$ |
| $5 (L/L7)^2 = 5 (10/7)^2 = 10.204\ MR^2$ |
| $5 (L/L8)^2 = 5 (10/8)^2 = 7.8125\ MR^2$ |
| $5 (L/L9)^2 = 5 (10/9)^2 = 6.1728\ MR^2$ |
| $5 (L/L10)^2 = 5 (10/10)^2 = 5.0000\ MR^2$ |

As can be seen, the effective Moment of Inertia of the case where f is applied at the COM (L10) is 1% of the case where f is applied at Li, while the moment of the same system, with respect to axis A, remains unchanged.

In application to at least some embodiments of the disclosed system, the above results demonstrate that a peripheral positioning of the prime movers (e.g., Planetary Motors (7)) with respect to the output shaft of the GTA system (e.g., the Rotor Output Shaft (4)), may advantageously reduce the moment of inertia of the system. Reducing moment of inertia may, for example, reduce the resistance to rotation of the system which may in turn, for example, advantageously reduce the input energy required to rotate the system when developing power output. Accordingly, a power input required to develop a target power output may be advantageously reduced (e.g., by one or more orders of magnitude).

For example, the prime movers may be at least partially used to define the center of mass by moving them towards (e.g., to) a periphery of rotation (e.g., together with counter-torque anchors such as gravitational anchors), thereby applying an output of the prime movers (e.g., output torque of an electric motor) to a periphery of rotation. For example, the distance between the center of mass of the rotating portion of the system and the point of application of motive force may be reduced (e.g., such as approaching or equal to zero). Such embodiments may, for example, advantageously multiply the output power achieved relative to the input power supplied.

Although various embodiments have been described with reference to the figures, other embodiments are possible. In some implementations, the GTA may be an electro-mechanical system, including one or more motors, mounted upon planet gears, set to rotate thereupon a stationary sun gear. For example, an extra degree of freedom, for each drive motor, may advantageously be secured. For example, each motor case may be making a single included turn about its sun gear during each rotation of each motor armature.

In some implementations, each orbiting motor armature and stator may include additional sets of bearings. For example, the bearing may restrict the motor to a location upon the planetary structure while providing a rotational degree of freedom permitting rotation of an orientation(s) of the motor(s) relative to the carrier arm, or carrier disk, as the case may be.

In some implementations, the GTA may include a gravitational lock, or a positional anchor. For example, the gravitational lock may use the force of gravity to give a continual downward orientation to the stator of each motor involved. In some implementations, the gravitational lock may advantageously allow orbital motion around the sun gear. Accordingly, the GTA may vastly increase the overall efficiency of the motors and the gearing of an epicyclic gearing system.

Although an exemplary system has been described with reference to FIGS. 1-15, other implementations may be deployed in other industrial, scientific, medical, commercial, and/or residential applications. In an illustration aspect, a vertically disposed Torque Amplification device may include a Prime Mover driven, three element, epicyclic planetary gearing system. For example, the Prime Mover driven, three element, epicyclic planetary gearing system may employ a stationary Sun Gear, at least one orbiting Planet Gear, driven directly by a Prime Mover, and/or a Carrier Arm/Carrier Link and/or Carrier Structure. For example, the Carrier Structure may advantageously constrain and localizes the position of the Prime Mover without imposing a rigid means of attachment of the Prime Mover to the Carrier Arm of the mechanism. In some implementations, the Prime Mover driven, three element, epicyclic planetary gearing system may further include a Connecting Rod and Gravitational Mass mechanically attached to the external casing of the Prime Mover. For example, the Connecting Rod and Gravitational Mass may advantageously supply a Counter-Torque for the Prime Mover without imposing reactionary Torques or Forces upon the Carrier Structure.

In some implementations, the Torque Amplification device may be configured such that the Prime Mover is driving the Planetary Gear directly. The Prime Mover may, for example, be free to orbit around the stationary Sun Gear along with the Planetary Gear. In some implementations, the stator of the Prime Mover may not be rigidly attached to the Carrier Structure.

In some implementations, the stationary Sun Gear and the orbiting Planetary Gear may advantageously enjoy a "one to one" gear ratio. For example, a complete revolution of the Planetary Gear about its own axis with respect to the Carrier Structure may result in one rotation of the Carrier Structure with respect to the stationary Sun Gear.

In some implementations, the stationary Sun Gear and the orbiting Planetary Gear may enjoy a gear ratio of greater than "one to one." For example, a complete revolution of the Planet Gear about its own axis with respect to the Carrier Structure may result in more than one rotation of the Carrier Structure with respect to the stationary Sun Gear.

In some implementations, the stationary Sun Gear and the orbiting Planetary Gear may enjoy a gear ratio of less than "one to one." For example, a complete revolution of the Planet Gear about its own axis with respect to the Carrier Structure may result in less than one rotation of the Carrier Structure with respect to the stationary Sun Gear.

In some implementations, the Carrier Structure may be mechanically connected to an Output Shaft. For example, the Output Shaft may pass through a center of the stationary Sun Gear. For example, the Output Shaft may include at least two bearings. In some implementations, the bearings may provide for relative motion of the Output Shaft and the Machine Main Frame to which the Sun Gear may be attached.

In some implementations, the Output Shaft may include pulleys and belts, additional gears, sprockets and chain, and/or timing belts. In some examples, the Output Shaft may advantageously transmit an amplified Torque to a practical load. For example, the practical load may be situated upon the Main Frame of the disclosed mechanism.

In some implementations, the Torque Amplification device may include at least two Prime Movers symmetrically disposed upon a Rotor Assembly. For example, each Prime Mover may directly drive an orbiting Planetary Gear with respect to a stationary Sun Gear. For example, the Prime Movers may advantageously ensure a condition of a dynamic balance as the Torque Amplification device rotates while still providing some or all benefits previously listed.

In some implementations, the Prime Movers may be symmetrically disposed upon a Rotor Assembly, or Rotor Disk. For example, the Prime Movers may each directly drive an orbiting Planetary Gear with respect to a stationary Sun Gear. For example, the Prime Movers may advantageously ensure a condition of dynamic balance as the device rotates while still providing some or all benefits as previously listed.

In some implementations, the Prime Movers may be symmetrically disposed upon a Rotor Assembly. For example, the Prime Movers may each directly drive an orbiting Planetary Gear with respect to a stationary Sun Gear. For example, the Prime Movers may advantageously ensure a condition of dynamic balance as the device rotates. In some examples, each of the Prime Mover may include a Connecting Rod and a Gravitational Mass mechanically attached to the external casing of the Prime Mover for supplying a Counter-Torque for the Prime Mover without imposing reactionary Torques, or Forces upon the Carrier Structure.

In some implementations, the Prime Movers may be symmetrically disposed upon a Rotor Assembly, or Rotor Disk. For example, the Prime Movers may each directly drive an orbiting Planetary Gear with respect to a stationary Sun Gear. For example, the Prime Movers may advantageously ensure a condition of dynamic balance as the device rotates. In some examples, each of the Prime Mover may include a Connecting Rod and a Gravitational Mass mechanically attached to the external casing of the Prime Mover, for the purpose of supplying a Counter-Torque for the Prime Mover, without imposing reactionary Torques, or Forces upon the Carrier Structure.

In some implementations, the Prime Movers may be symmetrically disposed upon a Rotor Assembly, or Rotor Disk. For example, the Prime Movers may each directly drive an orbiting Planetary Gear with respect to a stationary Sun Gear. For example, the Prime Movers may advantageously ensure a condition of dynamic balance as the device rotates. In some implementations, each of the Prime Movers may include a Connecting Rod and a Roller Assembly or "Cam Follower," mechanically attached to the external casing of the Prime Mover. For example, the Connecting Rod and the Roller Assembly may advantageously supply a Counter-Torque for the Prime Mover without imposing reactionary Torques, or Forces upon the Carrier Structure.

In some implementations, the Prime Movers may be symmetrically disposed upon a Rotor Assembly, or Rotor Disk. For example, the Prime Movers may each directly drive an orbiting Planetary Gear with respect to a stationary Sun Gear. For example, the Prime Movers may advantageously ensure a condition of dynamic balance as the device rotates. In some implementations, each of the Prime Movers may include a Connecting Rod and a Roller Assembly or "Cam Follower," mechanically attached to the external casing of each Prime Mover. For example, the Connecting Rod and the Roller Assembly may be arranged to follow contours of a specially designed Elliptical Cam structure. For example, the Connecting Rod and the Roller Assembly may advantageously supply a Counter-Torque for the Prime Mover, without imposing reactionary Torques, or Forces upon the Carrier Structure.

Some implementations with a Cam (e.g., elliptical) structure may, for example, be configured to prevent displacement of corresponding Gravitational Anchor(s) out of a desired orientation (e.g., vertical), thereby reducing or preventing undesired displacement of the Gravitational Anchors out of the desired orientation (e.g., as disclosed at least with reference to FIG. 12). Such implementations may, by way of example and not limitation, advantageously provide neutralization of spreading forces even in the absence of multiple binding chain(s).

At least two methods and related apparatus of Reactionary Torque Isolation, with respect to the carrier arm, have been disclosed herein. Both methods make use (e.g., exclusively) of the Natural Force of Gravity, to achieve various objectives such as disclosed herein. In various embodiments, other Natural Forces may be employed (e.g., to achieve the same and/or other objectives). For example, some mechanisms may make use of magnetic force(s). Some implementations may, for example, employ electro-static forces. In some examples, frictional forces may be employed. Centrifugal forces may, for example, be used in some mechanisms. Some embodiments may, for example, utilize inertial forces. In some examples, hydraulic forces may be used. As an illustrative example, pneumatic forces may be used. Forces derived from other sources may, for example, be used. Accordingly, some embodiments may use one or more Natural Forces, for example, to isolate the Prime Mover's reactionary torque component upon the carrier arm of the (three element) planetary gearing arrangement (e.g., as depicted with respect to the figures).

In some implementations, the Prime Mover may include mechanism of primary motivation, suitably modified for such orbital application, and amply supplied with fuel, electricity, control commands, feedback channels and other requirements. For example, the modifications may allow the Prime Mover to operate in a Rotating Reference Frame. In some examples, the Prime Mover may be Air Powered, Electrically Powered, Hydraulically Powered, Water Powered, or Fuel Powered.

In some implementations, the Prime Mover may be Electric Motors, especially designed to function in a Rotating Reference Frame. For example, the Electric Motors may be of any known variety, including, but not limited to DC Motors, Single Phase AC Motors, Three Phase Motors, Reluctance Motors, Repulsion Motors or Stepping Motors.

In some implementations, the Prime Mover may be a Direct Current Motor, especially designed to function in a Rotating Reference Frame, and to interact with a Connecting Rod and a Gravitational Mass, or Anchor, which may provide a counter Torque for the Direct Current Motor, without imposing reactionary Torques, or Forces upon the Carrier Structure.

In some implementations, the Direct Current Motor may include an armature shaft directly driving an orbiting Planetary Gear with respect to a stationary Sun Gear, and a stator shaft extension, and a hub mechanically united with a Connecting Rod and a Gravitational Mass which provides a Counter-Torque for the Direct Current Motor, without imposing a reactionary Torque upon the Direct Current Motor case, constrained within the Carrier Arm of the mechanism. For example, the double shafted Direct Current Motor may further include a double set of bearings, which allow for relative motion of the Motor Armature with respect to the Motor Stator, and allow for relative motion between the Motor Stator and the Rotor Structure.

In some implementations, the Direct Current Motor may include two shaft extensions emerging from a substantially cylindrical body. For example, the shaft extensions may receive an input of electrical power via, for example, slip rings, brushes, and appropriate wiring, while remaining free to rotate in two degrees of angular freedom, simultaneously being constrained and localized to one particular region upon the Rotor Structure, by the use of additional bearings mounted upon the Stator portion of the Direct Current Motor.

In some implementations, the Direct Current Motor may have a substantially cylindrical body design. For example the Direct Current Motor may include a sleeve of insulating material disposed upon a significant portion of the motor's cylindrical surface. For example, the insulating material may have an axis that is coinciding with the cylindrical axis of the Direct Current Motor. For example, the insulating material may advantageously insulate and support two brass Slip Rings upon the motor's cylindrical surface. For example, the brass Slip Rings may supply electrical power to the interior workings of the motor, by means of adequate wiring to the DC Motor's internal brushes and commutator bars.

In some implementations, the Slip Ring assembly may be mounted upon the substantially cylindrical surface of the DC Drive Motor's body. In some examples, the Slip Ring may be contacted by two brushes of highly conductive material. For example, the brushes may be held and positioned by two brush holder mechanisms within the Rotor Assembly. In some implementations, the brushes may advantageously make adequate contact with the Slip Rings, and thereby conduct electrical current into the Direct Current Drive Motor.

In some implementations, two Direct Current Motors may be symmetrically disposed upon a Rotor Assembly, or Rotor Disk. For example, the Direct Current Motor may each be directly driving an orbiting Planetary Gear with respect to a stationary Sun Gear. For example, the Direct Current Motors may advantageously ensure a condition of dynamic balance as the device rotates. For example, each Prime Mover may include a Connecting Rod and a Gravitational Mass mechanically attached to the external casing of the Direct Current Motors. For example, the Connecting Rod and the Gravitational Mass may supply a Counter-Torque for the Direct Current Motors without imposing reactionary Torques, or Forces upon the Carrier Structure.

In some implementations, the two or more Slip Ring assemblies are mounted upon the substantially cylindrical surface of the DC Drive Motor's body, and each contacted by two or more brushes of highly conductive material, which are held and positioned by two brush holder mechanisms, for each motor, and so mounted within the Rotor Assembly so as to make adequate contact with each set of the Slip Rings, thereby conducting electrical current into each of the Direct Current Drive Motors.

In some implementations, the plurality of Direct Current Electric Motors may be symmetrically disposed upon a Rotor Assembly, or a Rotor Disk. For example, the Direct Current Electric Motors may each directly driving an orbiting Planetary Gear with respect to a stationary Sun Gear to ensure a condition of dynamic balance as the device rotates. For example, each Prime Mover may include a Connecting Rod and a Roller Assembly mechanically attached to the external casing of the Prime Mover. For example, each Prime Mover may be arranged to follow contours of a specially designed Elliptical Cam structure, for the purpose of supplying a Counter-Torque for the Prime Mover, without imposing reactionary Torques, or Forces upon the Carrier Structure.

In some implementations of the Torque Amplification mechanism, the Carrier Structure may be mechanically connected to an Output Shaft, which passes through the center of the stationary Sun Gear and is equipped with at least two bearings of appropriate design, which provide for relative motion of the Output Shaft and the Machine Main Frame, to which the Sun Gear is rigidly attached. The Output Shaft may also support a set of brass Slip Rings, insulated from the Output Shaft, and supplied with highly conductive brushes, supported in Brush Holders mounted on the mechanism Main Frame, and utilized for the purpose of supplying electrical power to the rotating reference frame, occupied by the Rotor Assembly, Planetary Drive Motors, and associated Counter-Torque devices. The Output Shaft may be "Hollow," or "Drilled," to allow for the passage of electrical conductors from the Output Shaft Slip Rings, past the bearings, and into the Rotor Assembly.

In some implementations, the Output Shaft Slip Rings may be replaced by an inductive coupling device, such as a Rotary Transformer, in conjunction with a Flying Bridge Rectifier arrangement, for the purpose of delivering electrical power from the stationary reference frame, into the Rotating Reference Frame of the Rotor Assembly.

In some implementations, the Drive Motor Slip Ring Assemblies and associated insulating sleeves may be replaced by an inductive coupling device, such as a Rotary Transformer, in conjunction with a Flying Bridge Rectifier arrangement, for the purpose of delivering electrical power into the Planetary Drive Motors.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A torque amplifier comprising:
 an output shaft extending along and rotating about a central axis;
 a rotor frame mechanically coupled to rotate about the central axis; and,
 a plurality of prime movers suspended in the rotor frame via a gimbal suspension and disposed radially to and orbiting about the central axis, each of the plurality of prime movers comprising:
  a rotor coupled to the output shaft by planetary gearing such that a torque generated by the rotor is transmitted to the output shaft via the planetary gearing;
  a stator; and,
  a counter-torque anchor coupled to the stator and suspended such that the counter-torque anchor generates a counter-torque on the stator such that the torque of the rotor and the corresponding counter-torque additively generate work relative to the central axis, the counter-torque anchor comprising a gravitational anchor, the gravitational anchor comprising a mass mechanically coupled to be translated in response to the counter-torque.

2. The torque amplifier of claim 1, wherein the plurality of prime movers comprises electric motors.

3. The torque amplifier of claim 1, wherein each of the plurality of prime movers is configured such that the output of each corresponding motor maintains a center-to-center distance between each of the other plurality of prime movers.

4. The torque amplifier of claim 1, wherein the gimbal suspension comprises a double set of bearings.

5. The torque amplifier of claim 1, wherein the central axis passes through a sun gear fixed to a frame and mechanically engaging the planetary gearing of the rotors such that rotation of the planetary gears induces rotation of the rotor frame about the central axis.

6. The torque amplifier of claim 1, further comprising an orientation constraint member coupled to stators corresponding to at least two of the plurality of prime movers and configured to resist rotation of the corresponding counter-torque anchors out of a predetermined orientation.

7. The torque amplifier of claim 6, wherein the orientation constraint member comprises a chain coupled to sprockets on the corresponding stators.

8. The torque amplifier of claim 6, wherein the orientation constraint member comprises an elliptical guide track engaging rotating followers of the corresponding counter-torque anchors.

9. The torque amplifier of claim 1, wherein the plurality of prime movers are disposed at a periphery of a carrier structure rotating about the central axis.

10. The torque amplifier of claim 1, further configured such that a corresponding mass of the plurality of prime movers is a majority of a mass rotating about the central axis.

11. A torque amplifier comprising:
 a power output coupling configured to rotate about a central axis; and,
 a plurality of prime movers disposed radially to and orbiting about the central axis, each of the plurality of prime movers comprising:
  a rotor coupled to the power output coupling by planetary gearing such that a torque generated by the rotor is transmitted to the power output coupling via the planetary gearing;
  a stator; and,
  a counter-torque anchor coupled to the stator and suspended such that the counter-torque anchor generates a counter-torque on the stator such that the torque of the rotor and the corresponding counter-torque additively generate work relative to the central axis.

12. The torque amplifier of claim 11, wherein the counter-torque anchor comprises a gravitational anchor, the gravitational anchor comprising a mass mechanically coupled to be translated in response to the counter-torque.

13. The torque amplifier of claim 11, wherein the plurality of prime movers comprises electric motors.

14. The torque amplifier of claim 11, wherein each of the plurality of prime movers is configured such that the output of each corresponding rotor maintains a center-to-center distance between each of the other plurality of prime movers.

15. The torque amplifier of claim 11, wherein the rotor is suspended in a rotor frame via a gimbal suspension.

16. The torque amplifier of claim 15, wherein the gimbal suspension comprises a double set of bearings.

17. The torque amplifier of claim 11, wherein the central axis passes through a sun gear fixed to a frame and mechanically engaging the planetary gearing of the rotors such that rotation of the planetary gears induces rotation of the rotor frame about the central axis.

18. The torque amplifier of claim 11, further comprising an orientation constraint member coupled to stators corresponding to at least two of the plurality of prime movers and configured to resist rotation of the corresponding counter-torque anchors out of a predetermined orientation.

19. The torque amplifier of claim 18, wherein the orientation constraint member comprises a chain coupled to sprockets on the corresponding stators.

20. The torque amplifier of claim 18, wherein the orientation constraint member comprises an elliptical guide track engaging rotating followers of the corresponding counter-torque anchors.

21. The torque amplifier of claim 11, wherein the plurality of prime movers are disposed at a periphery of a carrier structure rotating about the central axis.

22. The torque amplifier of claim 11 further configured such that a corresponding mass of the plurality of prime movers is a majority of a mass rotating about the central axis.

23. The torque amplifier of claim 11, wherein the power output coupling comprises an output shaft extending along and rotating about the central axis.

* * * * *